US011389761B1

(12) United States Patent
Stark, Jr.

(10) Patent No.: US 11,389,761 B1
(45) Date of Patent: Jul. 19, 2022

(54) SYSTEM AND METHOD FOR IMPROVING THE PERFORMANCE AND LOWERING THE COST OF ATMOSPHERIC CARBON DIOXIDE REMOVAL BY DIRECT AIR CAPTURE

(71) Applicant: Joseph J. Stark, Jr., Katonah, NY (US)

(72) Inventor: Joseph J. Stark, Jr., Katonah, NY (US)

(73) Assignee: Joseph J. Stark, Katonah, NY (US)

( * ) Notice: Subject to any disclaimer, the term of this patent is extended or adjusted under 35 U.S.C. 154(b) by 0 days.

(21) Appl. No.: 17/345,851

(22) Filed: Jun. 11, 2021

(51) Int. Cl.
*B01D 53/02* (2006.01)
*B01D 53/04* (2006.01)
(Continued)

(52) U.S. Cl.
CPC ..... *B01D 53/0446* (2013.01); *B01D 53/0423* (2013.01); *B01D 53/62* (2013.01); *B01D 53/96* (2013.01); *B01J 20/3483* (2013.01); *B01D 2253/00* (2013.01); *B01D 2257/504* (2013.01); *B01D 2258/06* (2013.01); *B01D 2259/4009* (2013.01)

(58) Field of Classification Search
CPC ........... B01D 53/0446; B01D 53/0423; B01D 53/62; B01D 53/96; B01D 2257/504; B01D 2258/06; B01D 2259/4009; B01J 20/3483; B01J 2253/00
See application file for complete search history.

(56) References Cited

U.S. PATENT DOCUMENTS 4,168,706 A * 9/1979 Fletcher ................... A62B 7/10
128/205.28
4,541,851 A * 9/1985 Bosquain ............ B01D 53/0446
96/126
(Continued)

FOREIGN PATENT DOCUMENTS

WO 2019161420 A1 8/2019

OTHER PUBLICATIONS

Eero Inkeri et al., Modeling of CO2 Capture with Water Bubble Column Reactor, Energies, MDPI, published Nov. 5, 2020, 13 pages.
(Continued)

*Primary Examiner* — Christopher P Jones
(74) *Attorney, Agent, or Firm* — Haynes and Boone, LLP

(57) ABSTRACT

Systems and methods for an atmospheric carbon dioxide removal system that includes a plurality of carbon capture containers, a plurality of fans, an air diverter, and a velocity stack. Each of the carbon capture containers has an outwardly facing side and an inwardly facing side with the inwardly facing side facing an enclosed space. The fans are disposed adjacent to the carbon capture containers. The fans are arranged to move air through the carbon capture containers in a first direction from the outwardly facing side into the enclosed space. The air diverter is disposed within the enclosed space and receives the air flowing in the first direction and redirects the air to flow in a second direction that is angled upwardly from the first direction. The velocity stack is disposed on top of the enclosed space and is configured to accelerate the flow of the air in the second direction.

19 Claims, 31 Drawing Sheets

(51) Int. Cl.
  *B01D 53/62* (2006.01)
  *B01D 53/96* (2006.01)
  *B01J 20/34* (2006.01)

(56) References Cited

U.S. PATENT DOCUMENTS

| | | | | |
|---|---|---|---|---|
| 5,338,450 | A * | 8/1994 | Maurer | B01D 53/0446 210/286 |
| 6,099,609 | A * | 8/2000 | Lira | F04D 29/281 55/400 |
| 6,334,889 | B1 * | 1/2002 | Smolarek | B01D 53/0446 96/149 |
| 6,352,578 | B1 * | 3/2002 | Sakata | B01J 20/28078 96/134 |
| 8,500,855 | B2 | 8/2013 | Eisenberger | |
| 8,574,354 | B2 | 11/2013 | Keith | |
| 9,341,408 | B2 | 5/2016 | Fleming | |
| 9,901,872 | B2 * | 2/2018 | Nagayasu | C01B 32/50 |
| 10,413,866 | B2 | 9/2019 | Eisenberger | |
| 10,512,880 | B2 | 12/2019 | Eisenberger | |
| 2002/0092421 | A1 * | 7/2002 | Hayes | C23C 14/48 95/107 |
| 2005/0160913 | A1 * | 7/2005 | Hrycak | A62B 19/00 96/243 |
| 2009/0292132 | A1 * | 11/2009 | Evans | B01J 20/10 549/518 |
| 2010/0064890 | A1 | 3/2010 | Keith | |
| 2011/0041688 | A1 | 2/2011 | Eisenberger | |
| 2011/0189075 | A1 | 8/2011 | Wright | |
| 2011/0197422 | A1 * | 8/2011 | Monereau | B01D 53/0431 29/428 |
| 2011/0203174 | A1 | 8/2011 | Lackner | |
| 2011/0203311 | A1 | 8/2011 | Wright | |
| 2011/0206581 | A1 * | 8/2011 | Ackley | B01D 53/0431 423/210 |
| 2011/0296872 | A1 | 12/2011 | Eisenberger | |
| 2012/0058032 | A1 | 3/2012 | Lackner | |
| 2013/0312606 | A1 | 11/2013 | Eisenberger | |
| 2015/0007725 | A1 | 1/2015 | Elliott | |
| 2015/0273385 | A1 | 10/2015 | Eisenberger | |
| 2017/0106330 | A1 | 4/2017 | Gebald et al. | |
| 2017/0113184 | A1 | 4/2017 | Eisenberger | |
| 2017/0326494 | A1 * | 11/2017 | Gebald | B01J 20/28052 |
| 2017/0354925 | A1 | 12/2017 | Heidel | |
| 2018/0169568 | A1 | 6/2018 | Eisenberger | |
| 2019/0291077 | A1 | 9/2019 | Pang et al. | |
| 2020/0009504 | A1 | 1/2020 | Eisenberger | |
| 2020/0047109 | A1 * | 2/2020 | Maxwell | C01B 13/02 |

OTHER PUBLICATIONS

Xiaoyang Shi et al., Sorbents for the Direct Capture of $CO_2$ from Ambient Air., Angew. Chem. Int. Ed. 2020, 59, 2-25, 25 pages.

Jimmie L. Williams, Monolith structures, materials, properties and uses, Elsevier Science B.V., Catalysis Today 69 (2001) 3-9, 34 pages.

Wei Zhong et al., Measurement and Determination of Friction Characteristic of Air Flow through Porous Media, Metals 2015, 5, 336-349; doi: 10.3390/met5010336, published Mar. 9, 2015.

Anshuman Sinha et al., Systems Design and Economic Analysis of Direct Air Capture of $CO_2$ through Temperature Vacuum Swing Adsorption Using MIL-101(Cr)-PEI-800 and mmen-Mg2 (dobpdc) MOF Adsorbents, DOI: 10.1021/acs.iecr.6b03887, Ind. Eng. Chem. Res. 2017, 56, 750-764.

Larryn W. Diamond et al., Solubility of $CO_2$ in Water from 1.6 to 100 ° C and from 0.1 to 100 MPa: evaluation of literature data and thermodynamic modelling, Elsevier, Fluid Phase Equilibria 208 (2003) 265-290.

J.F. Richardson, J.H. Harker, and J.R. Backhurst, Coulson and Richardson's Chemical Engineering (5th ed. vol. 2), Chapter 4—Flow of Fluids through Granular Beds and Packed Columns, Butterworth-Heinemann, DOI: https://doi.org/10.1016/B978-0-08-049064-9.50015-1, pp. 191-210.

Alexander Rieder et al., Understanding solvent degradation: A study from three different pilot plants within the OCTAVIUS project, Energy Procedia 114 (2017) 1195-1209.

Kyungmin Min et al., Oxidation-stable amine-containing asorbents for carbon dioxide capture, Nature Communications (2018)9:726. | DOI: 10.1038/s41467-018-03123-0 | www.nature.com/naturecommunications, pp. 1-7.

Adam Powell, 3.21 Lectures on Fluid Flow and Kinetics, Apr. 23-30, 2003, pp. 1-26.

Steam Tables, https://energy.mo.gov/sites/energy/files/steam-tables_power-plant-service.pdf, pp. 2-7.

Calvin H. Bartholomew et al., Chapter 2, Catalyst Materials, Properties, and Preparation, Fundamentals of Industrial Catalytic Processes, Second Edition, 2006, pp. 60-117.

Lichun Li, et al., The Henry Coefficient of $CO_2$ in the MEA-$CO_2$-$H_2O$ System, Energy Procedia 114 (2017) 1841-1847.

Solrun Johanne Vevelstad, et al, Oxygen and temperature effect on formation of degradation compounds from MEA, Energy Procedia 63 (2014) 957-975.

The New York Blower Company, Fan Laws and System Curves, Engineering Letter 2, 2 pages, Willowbrook, Illinois.

Chaitanya Dhoke, et al, Review on Reactor Configurations for Adsorption-Based $CO_2$ Capture, Ind. Eng. Chem. Res. 2021, 3779-3798.

Mohammed K. Al Mesfer et al., Continuous Fixed Bed $CO_2$ Adsorption: Breakthrough, Column Efficiency, Mass Transfer Zone, MDPI, Processes 2020, 8, 1233, pp. 1-16.

T.W. Engler, Chapter 6—Flow through porous media (Petroleium Engineering 524), New Mexico Tech., p. 6.1-6.33.

Wojciech Sobieski et al, Darcy's and Forchheimer's Laws in Practice. Part 1. The Experiment, Technical Sciences 17(4), 2014, 321-335.

Qian Yu et al, A Radial Flow Contactor for Ambient Air $CO_2$ Capture, Appl. Sci. 2020, 10, 1080; doi: 10.3390/app10031080, p. 1-20.

U.S. Environmental Protection Agency Combined Heat and Power Partnership, Catalog of CHP Technologies, Sep. 2017, 150 pages.

Chao Chen, et al., $CO_2$ capture by Amine-functionalized nanoporous materials: A review, Korean J. Chem. Eng., vol. 31, No. 11, 1919-1934 (Nov. 2014).

Christopher F. Cogswell, et al., Effect of Pore Structure on $CO_2$ Adsorption Characteristics of Aminopolymer Impregnated MCM-36, Langmuir ACS Publications, DOI: 10.1021/la505037f, 2015, pp. A-H.

Katarzyna Maresz et al., Effect of support structure and polyamine type on $CO_2$ capture in hierarchically structured monolithic sorbents, Chemical Engineering Journal 383 (2020) 123175, pp. 1-10.

Eugene J. Kim et al., Cooperative carbon capture and steam regeneration with tetraamine-appended metal-organic frameworks, Science 369, 392-396 (2020) Jul. 24, 2020, pp. 1-5.

John L. Sorrels et al., Chapter 1, Carbon Adsorbers, https://www.epa.gov/sites/production/files/2018-10/documents/final_carbonadsorberschapter_7thedition.pdf, Oct. 2018, 51 pages.

Wim Buijs et al., Direct Air Capture of $CO_2$ with an Amine Resin: A Molecular Modeling Study of the $CO_2$ Capturing Process, Ind. Eng. Chem. Res. 2017, 56, 12297-12304.

David W. Keith et al., A Process for Capturing $CO_2$ from the Atmosphere, Joule 2, 1-22, Aug. 15, 2018.

Toshiyuki Yokota et al., A new technique for preparing ceramics for catalyst support exhibiting high porosity and high heat resistance, Catalysis Today 69 (2001) 11-15.

Robert E. Trubac et al, Micro-engineered catalyst systems: ABB's advancement in structured catalytic packings, Catalysis TOday 69 (2001) 17-24.

William P. Addiego et al., Iron oxide-based honeycomb catalysts for the dehydrogenation of ethylbenzene to styrene, Catalysis Today (2001) 25-31.

Donald R. Cahela et al., Permeability of Sintered microfibrous composites for heterogeneous catalysis and other chemical processing opportunities, Catalysis Today 69 (2001) 33-39.

* cited by examiner

SYSTEM AND METHOD FOR IMPROVING THE PERFORMANCE AND LOWERING THE COST OF ATMOSPHERIC CARBON DIOXIDE REMOVAL BY DIRECT AIR CAPTURE

CROSS-REFERENCE TO APPLICATIONS

This application relates to corresponding U.S. application Ser. No. 17/345,753, filed on Jun. 11, 2021, titled System and Method for Improving the Performance and Lowering the Cost of Atmospheric Carbon Dioxide Removal by Direct Air Capture and U.S. application Ser. No. 17/345,890, filed on Jun. 11, 2021, titled System and Method for Improving the Performance and Lowering the Cost of Atmospheric Carbon Dioxide Removal by Direct Air Capture, both of which are incorporated by reference herein in their entireties.

TECHNICAL FIELD

The present disclosure relates generally to systems and methods for removing carbon dioxide from the atmosphere, and in particular to systems and methods for optimizing the advection of carbon dioxide from the atmosphere, systems and methods for optimizing the contact and capture of carbon dioxide by a sorbent, and systems and methods for optimizing sorbent regeneration and removal of carbon dioxide therefrom for utilization or sequestration.

BACKGROUND

Recent developments have focused attention on achieving a goal of net zero emissions where globally no more carbon is emitted into the atmosphere that what is removed. There is currently no feasible way to avoid using the carbon emitting fuels that are required to sustain present living standards.

Systems and methods are being implemented around the world to remove the carbon dioxide from the atmosphere in an effort to achieve the goal of net zero emissions. Current systems and methods are costly both in terms of money and resources required, such as land and energy. Additionally, the current state of the art systems do not remove carbon dioxide from the atmosphere in large enough quantities to make a significant impact when compared to legacy emissions and the overall amount of carbon dioxide being emitted each year.

To reduce the amount of carbon dioxide in the atmosphere and achieve the goal of net zero emissions, technological innovation is needed to drive down the cost of atmospheric carbon dioxide removal.

SUMMARY

In an example aspect, the present disclosure is directed to a direct air capture structure for removing atmospheric carbon dioxide that has improved performance and lower cost than existing atmospheric carbon dioxide removal structures. In some example implementations, the structure may include a sorbent media filled cylinder, a fan for blowing air through the cylinder and over the sorbent media, and a regeneration station for removing carbon dioxide from the sorbent media.

In an aspect, the direct air capture structure may include stacks of sorbent media filled cylinders arranged in an almost circular manner. In an aspect, multiple fans may be placed on the exterior of the circle of sorbent media filled cylinder stacks. In an aspect, the fans may blow air from the exterior of the structure, through the cylinders, over the sorbent media, and into the interior of the direct air capture structure. In this manner, the sorbent media may collect carbon dioxide from bulk air flow advection through the cylinder. In an aspect, one or more regeneration stations may be positioned around the exterior of the direct air capture structure. Each regeneration station may lock onto a cylinder and remove the collected carbon dioxide from the sorbent media. In an aspect, the direct air capture structure may rotate, thereby moving the sorbent media filled cylinder stacks from a state of carbon collection, where the fans blow air through the cylinders, to a state of carbon release, were the regeneration station removes the collected carbon from the sorbent media.

In an aspect, an air shifting structure may be erected inside the direct air capture structure to direct the flow of air up and out of the direct air capture structure. In an aspect, the air shifting structure may include a fabric material arranged in a manner to direct the flow of air away from the sides of the structure and out of the open top of the structure.

In an aspect, a roof structure may be placed on top of the direct air capture structure to accelerate the flow of air out of the direct air capture structure. In an aspect, the roof structure may be wider at the bottom than at the top, having a larger opening at the bottom than at the top. In an aspect, the walls of the roof structure may slope inward and upward from the exterior walls of the direct air capture structure. In an aspect, the roof structure is suitable for accelerating the flow of air from within the structure upward and away from the structure.

In an aspect, the regeneration station may form a seal around a sorbent media containing cylinder. In an aspect, the regeneration station may pull a vacuum within the cylinder to remove air from the sorbent media containing cylinder. In an aspect, the regeneration station may fill and flush the cylinder with water to displace any residual air from the sorbent media containing cylinder. In an aspect, the regeneration station may heat the cylinder to promote the release of carbon dioxide from the sorbent media containing cylinder. In an aspect, the regeneration station may pull a vacuum within the cylinder to further promote the release of carbon dioxide from the sorbent media containing cylinder and to cool it. In an aspect, the regeneration station may fill and pressurize the cylinder with a cold water to further promote the release of carbon dioxide from the sorbent media containing cylinder. In an aspect, the regeneration station may mechanically vibrate the cylinder to promote the release of carbon dioxide from the sorbent media containing cylinder into the cold water. The regeneration station may then capture the carbon dioxide for transport by pipes to the centralized balance of plant for disposal or utilization.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, explain the principles of the present disclosure.

DETAILED DESCRIPTION

Figure 1A:
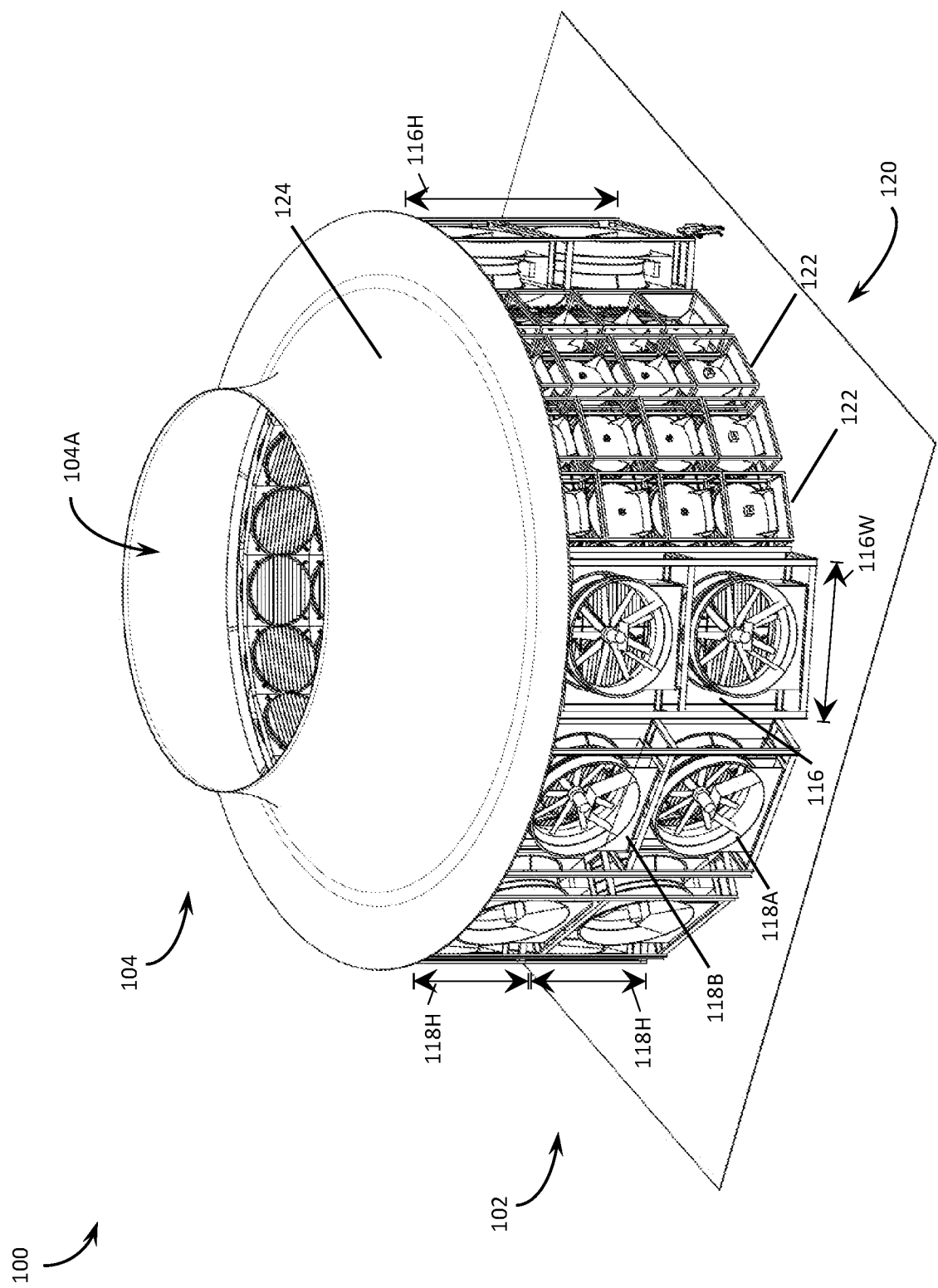
FIGS. 1A-1D are perspective, side, and top-down illustrations of material structural components of an atmospheric carbon dioxide removal structure, according to some embodiments of the present disclosure.
Figure 1B:
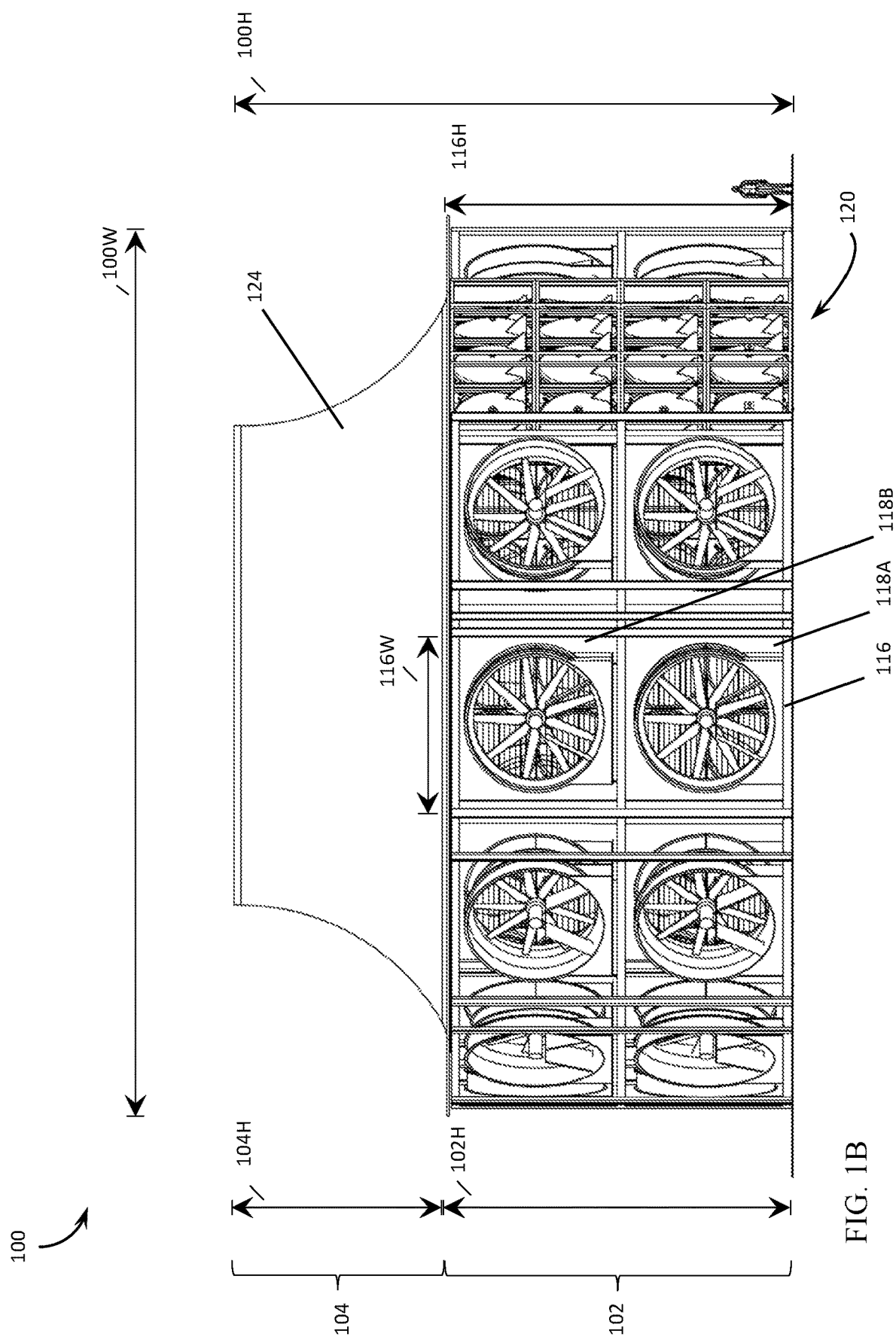

For promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

The Direct Air Capture Structure

The Direct Air Capture Structure

Figure 1C:
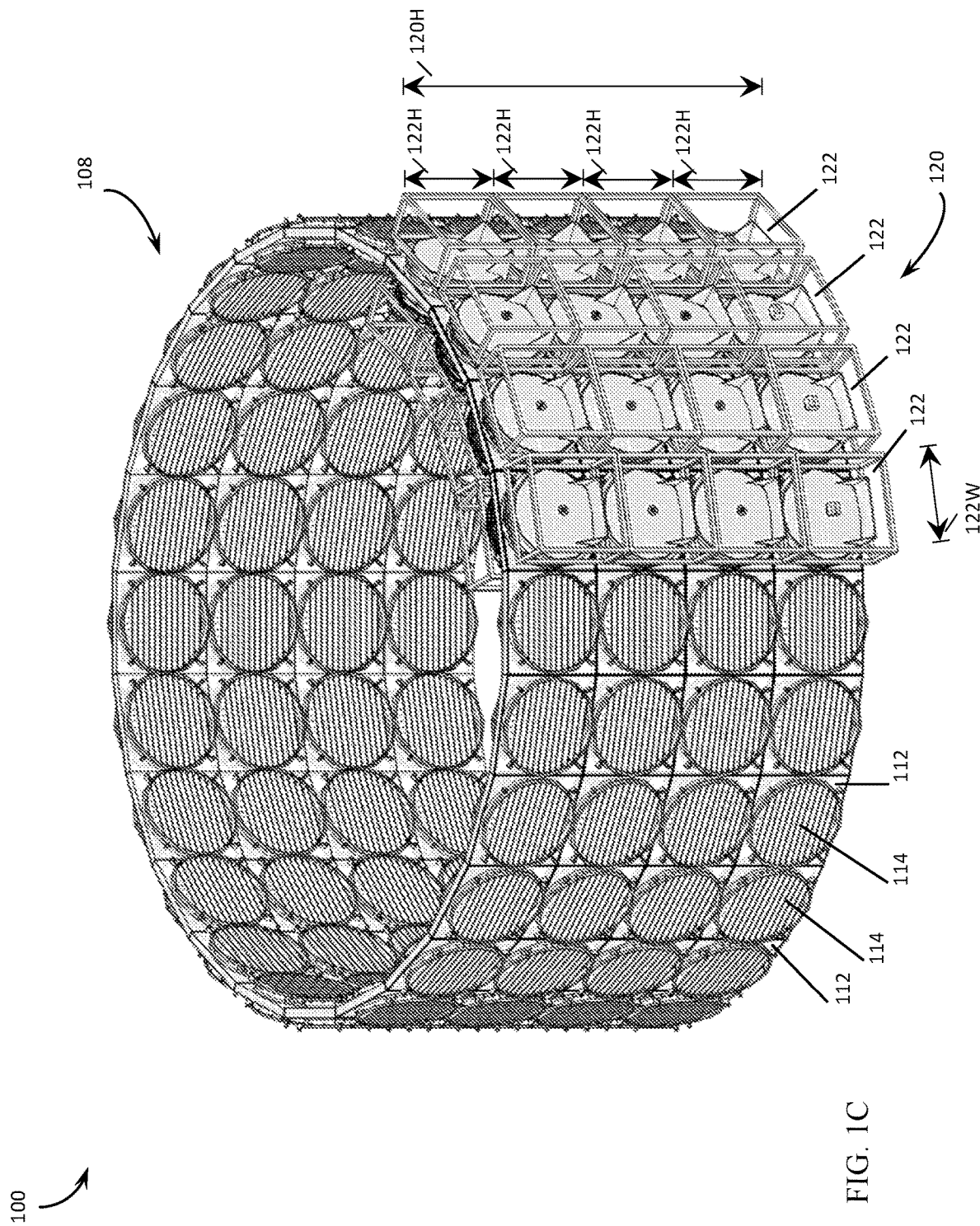
Figure 1D:
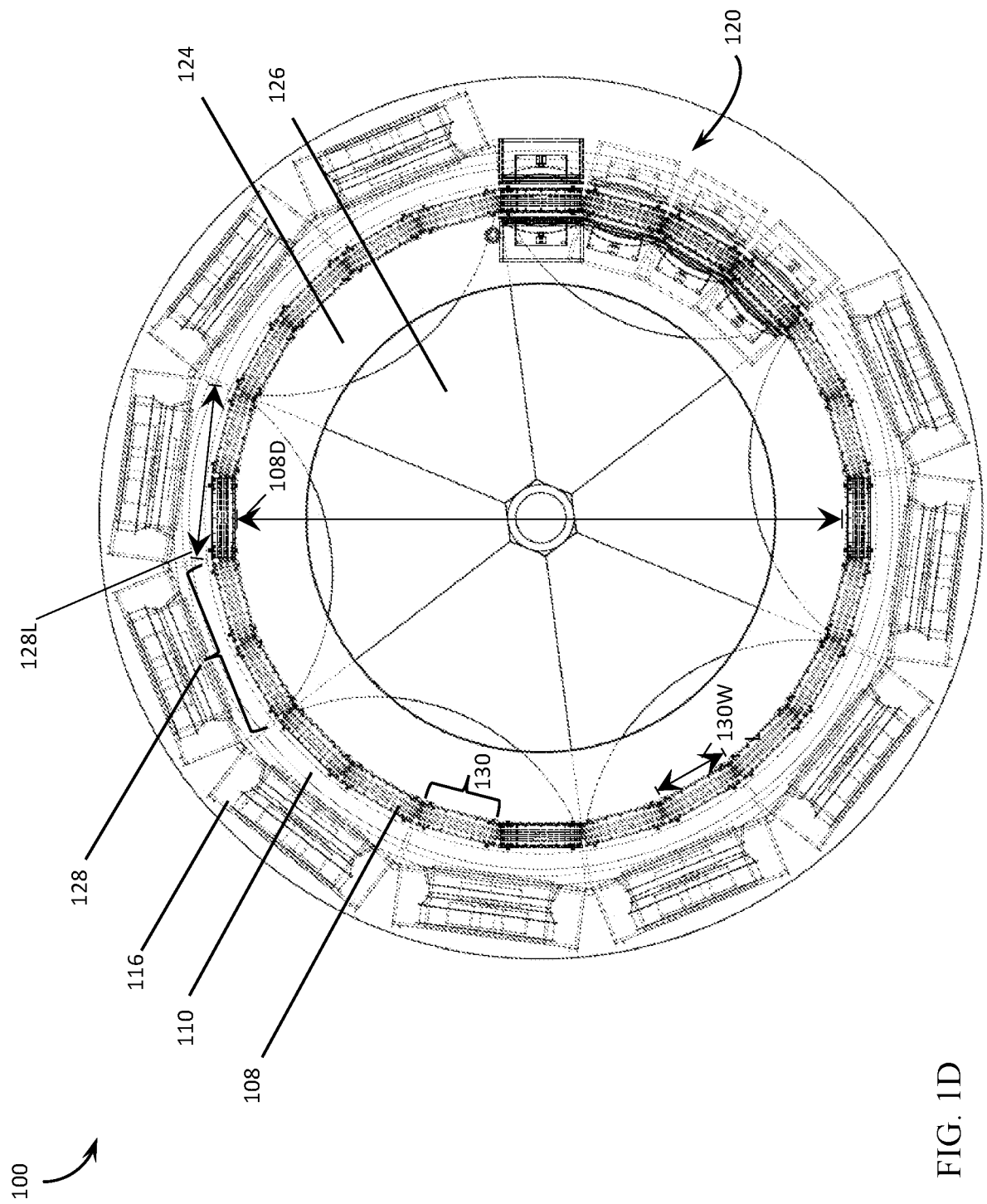

FIGS. 1A-1D depict perspective, side view, and top down illustrations, respectively, of an atmospheric carbon dioxide removal direct air capture (DAC) structure 100 according to some embodiments of the present disclosure. FIG. 1C shows a perspective illustration of only some components of the DAC structure 100. The DAC structure 100 includes a lower structure 102 and a roof structure 104. The lower structure 102 includes a hoop structure 108, and an exterior support structure 110 best shown in hidden lines in FIG. 1D. In some embodiments, an interior support structure 106 may be part of lower structure 102. The hoop structure 108 shown in FIG. 1C supports one or more square cells 112 that each includes a carbon capture cylinder 114 that holds a sorbent material. One or more fan panel 116 is secured to the exterior support structure 110. Each fan panel 116 may include a bottom fan 118A and a top fan 118B. A regeneration station 120, including one or more regeneration structures 122, is also secured to the exterior support structure 110. The roof structure 104 has an opening 104A on top to allow air to flow out of the top of the DAC structure 100. In some embodiments, the roof structure 104 may be a velocity stack 124. In some embodiments, an air diverter 126 (also referred to as a hex shifter) is located inside the lower structure 102. The air diverter 126 may redirect the air flowing into the DAC structure 100 upward and out the opening in the roof structure 104.

The exterior support structure 110 is shown in this example implementation as a multi-sided polygon having sides 128. Each side 128 of the exterior support structure 110 includes either a fan panel 116 or a portion of the regeneration station 120. In the depicted embodiment, the exterior support structure 110 has twelve sides 128 having ten fan panels 116 occupying ten of the sides 128 and the regeneration station 120 occupying two of the sides 128. Therefore, fan panels 116 occupy about ⅚ of the exterior of the DAC structure 100 and the regeneration station 120 occupies about ⅙ of the exterior of the DAC structure 100. Although the exterior support structure 110 may have more than twelve sides 128 or fewer than twelve sides 128, twelve sides 128 will be used in the discussion below for the sake of clarity and consistency. Each side 128 has a length 128L that may be about 3.0 m to about 10 m. In some embodiments, the length 128L may be about 5 m.

The hoop structure 108 may be a multi-sided polygon having sides 130. The number of sides 130 of the hoop structure 108 may be a multiple of the number of sides 128 of the exterior support structure. In the depicted embodiment, the hoop structure 108 has 24 sides, although more or fewer sides are contemplated. Each side of the hoop structure 108 supports one or more square cells 112. This configuration allows the hoop structure 108 to rotate freely around the interior of the exterior support structure 110. Although the hoop structure 108 may have more than 24 sides 130 or fewer than 24 sides 130, 24 sides 130 will be used in the discussion below for the sake of clarity and consistency.

The one or more square cells 112 may be stacked in a vertical direction. In the illustrated embodiment, the hoop structure 108 contains 24 stacks of four square cells 112. This configuration includes 24 stacks of square cells 112 supported by the hoop structure 108 for a total of 96 square cells 112, or 96 carbon capture cylinders 114, also referred to as carbon capture containers. As arranged, each fan 118 may blow air through 4 carbon capture cylinders 114 in a 2×2 grid pattern. Each carbon capture cylinder 114 has an outwardly facing side facing a fan 118 and an inwardly facing side facing the interior of the DAC structure 100.

Each side 130 of the hoop structure 108 has a width 130W and the hoop structure 108 has a diameter of 108D. The width 130W may be about 1.5 m to about 5 m giving a diameter 108D of about 11.5 m to about 39 m, though larger and smaller values are contemplated. In some embodiments, the width 130W may be about 2.5 m giving a diameter 108D of about 20 m. In some embodiments, the width 130W may be larger than 5 m giving a diameter 108D of more than 39 m.

In the example implementation shown, the DAC structure 100 has an overall height 100H that may be about 9.3 m to about 31.7 m, although other sizes, both larger and smaller are contemplated. In some embodiments, height 100H may be about 16.3 m. In the example implementation shown, the base structure 102 has a height 102H that may be about 5.7 m to about 19.6 m. In some embodiments, the height 102H may be about 10 m, although other sizes, larger and smaller are contemplated. The example roof structure 104 shown has a height 104H that may be about 3.6 m to about 12.1 m. In some embodiments, the height 104H may be about 6.3 m, although other sizes, larger and smaller are contemplated. The height 100H is a combination of height 102H and 104H and about 1.6 times larger than the height 102H, which may be the golden ratio.

In the example implementation shown, the DAC structure 100 has an overall width 100W that may be about 15.1 m to about 51.4 m, although other sizes, both larger and smaller are contemplated. In some embodiments, width 100W may be about 26.4 m, or about 1.6 times larger than height 100H, which may be the golden ratio.

Each fan panel 116 has a height 116H, that is the sum of a height 118H of the bottom fan 118A and the height 118H of the top fan 118B, and a width 116W. In the example implementation shown, height 118H may be about 2.9 m to about 9.8 m. Therefore, height 116H may be about 5.8 m to about 19.6 m, although other sizes, larger and smaller are contemplated. In some embodiments, height 118H may be about 5 m and height 116H may be about 10 m, although other sizes, larger and smaller are contemplated. Width 116W may be about 3 m to about 10 m, though larger and smaller values are contemplated. In some embodiments, width 116W may be about 5 m. Each fan 118 is configured to convey air from the exterior of the DAC structure 100, through the square cells 112, and into the interior of the DAC structure 100. More information about the fans will be provided further below.

The regeneration station 120, including the one or more regeneration structures 122, has a total height of 120H that may be about the same height as the fan panels 116. Each regeneration chamber 122 has a width 122W and a height 122H. In the illustrated embodiment, the width 122W may be about half the size of length 128L and about the same width as 130W. In some embodiments, width 122W may be about 1.5 m to about 5 m, though larger and smaller values are contemplated. In some embodiments, the width 122W may be about 2.5 m. In the illustrated embodiment, the height 122H may be about half the height 118H, or about half the height of a fan 118, though larger and smaller ratios are contemplated. In the illustrated embodiment, the height 122H may be about 2.5 m. In some embodiments, the height 122H may be about 1.5 m to about 5 m, though larger and smaller values are contemplated. The regeneration structure 122 will be described in more detail further below, with reference to a regeneration structure 1500, shown in FIGS. 14B and 15-17.

The Hoop Structure

Figure 2:
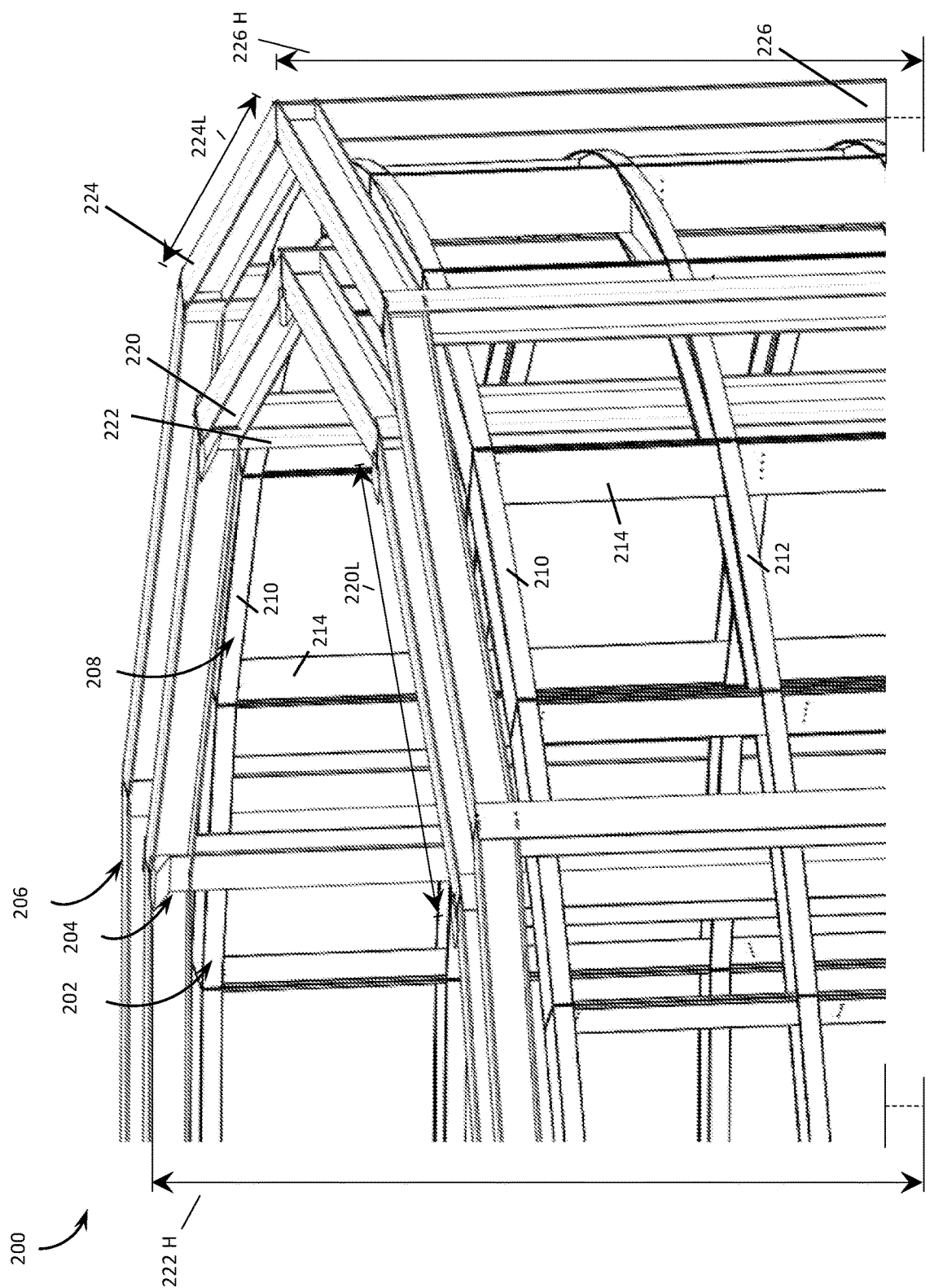
FIGS. 2-6 are perspective illustrations of portions of an exemplary hoop structure of an atmospheric carbon dioxide removal structure, according to some embodiments of the present disclosure.

FIG. 2 depicts a perspective view of the inner structure of the DAC structure 100. The inner structure 200 provides the support necessary for the cells holding the carbon capturing media including a hoop structure 202, an interior support structure 204, and an exterior support structure 206 with the hoop structure 202 between the interior support structure 204 and the exterior support structure 206. The hoop structure 202, interior support structure 204, and exterior support structure 206 may be examples of the hoop structure 108, the interior support structure 106, and exterior support structure 110 described above with respect to FIGS. 1A-1D. The inner structure 200, as described further below, may be designed with the interior support structure 106, and/or exterior support structure 110. The inner structure 200, as described further below, may be designed in way that allows the hoop structure 202 to rotate in a clockwise direction around the inner structure 200, while being supported and guided by the interior support structure 204 and/or the exterior support structure 206. In some embodiments, the hoop structure 202 may rotate in counter-clockwise direction. The rotation of the hoop structure 202 enables the transport of a sorbent material from a carbon capture phase (e.g., in front of a fan) to a carbon release phase (e.g., at the regeneration station).

The hoop structure 202 includes multiple structural frames 208. Each structural frame 208 includes a horizontal top member 210, a horizontal bottom member 212, and two vertical side members 214. The horizontal top member 210 and the horizontal bottom member 212 may be fastened to the two vertical side members 214 to form the structural frame. In some embodiments, the structural frame 208 has a rectangular shape. In some alterative embodiments, the structural frame 208 may have a square shape. In some other embodiments, the structural frame 208 may have a hexagonal shape. In other embodiments, the structural frame 208 may have different shapes. Each structural frame 208 may be sized to receive and support a carbon capture media container, such as the square cell 112 described above or the carbon capture cylinder described below.

Multiple structural frames 208 may be connected to form a grid having rows and columns of structural frames 208. The bottom member 212 of a first upper structural frame 208 may be connected to or serve as the top member 210 of a first lower structure frame 208 to form a grid having two rows and one column. The side member 214 of the first upper structural frame 208 may be connected to or serve as the side member 214 of an adjacent second upper structural frame 208. The side member 214 of the first lower structural frame 208 may be connected to or serve as the side member 214 of a second lower structural frame 208, forming a grid having two rows and two columns. This process may be repeated until the grid is the appropriate size and constructed of a thickness and metallurgy to provide structural integrity. The grid may be formed in a hoop that is disposed around the DAC structure 100.

In the embodiment illustrated in FIGS. 1A-1D, the grid has four rows and twenty-four columns for a total of ninety-six structural frames 208. While the structural frames 208 may be straight and rigid, the connections between the side members 214 of each structural frame 208 may be connected in a manner that allows the hoop structure 202 to form a circular shape or near circular shape. In some embodiments, a spacer member may be placed in between each of the side members 214 of each structural frame 208 to form the curve necessary for the hoop structure 202. In some embodiments, the connection between each of the side members 214 of each structural frame 208 may be flexible, allowing the hoop structure 202 to form an almost circular shape. In some embodiments, the structural frame 208 is curved, allowing the hoop structure 202 to form a circular shape. Carbon capture media container supported by the hoop structure 202 may be straight, that is, not curved, but may still be supported by a curved structural frame 208 within hoop structure 202. In this way, each carbon capture media container may still be presented squared, e.g., straight on, to a fan 118 or a regeneration structure 122.

Figure 3:
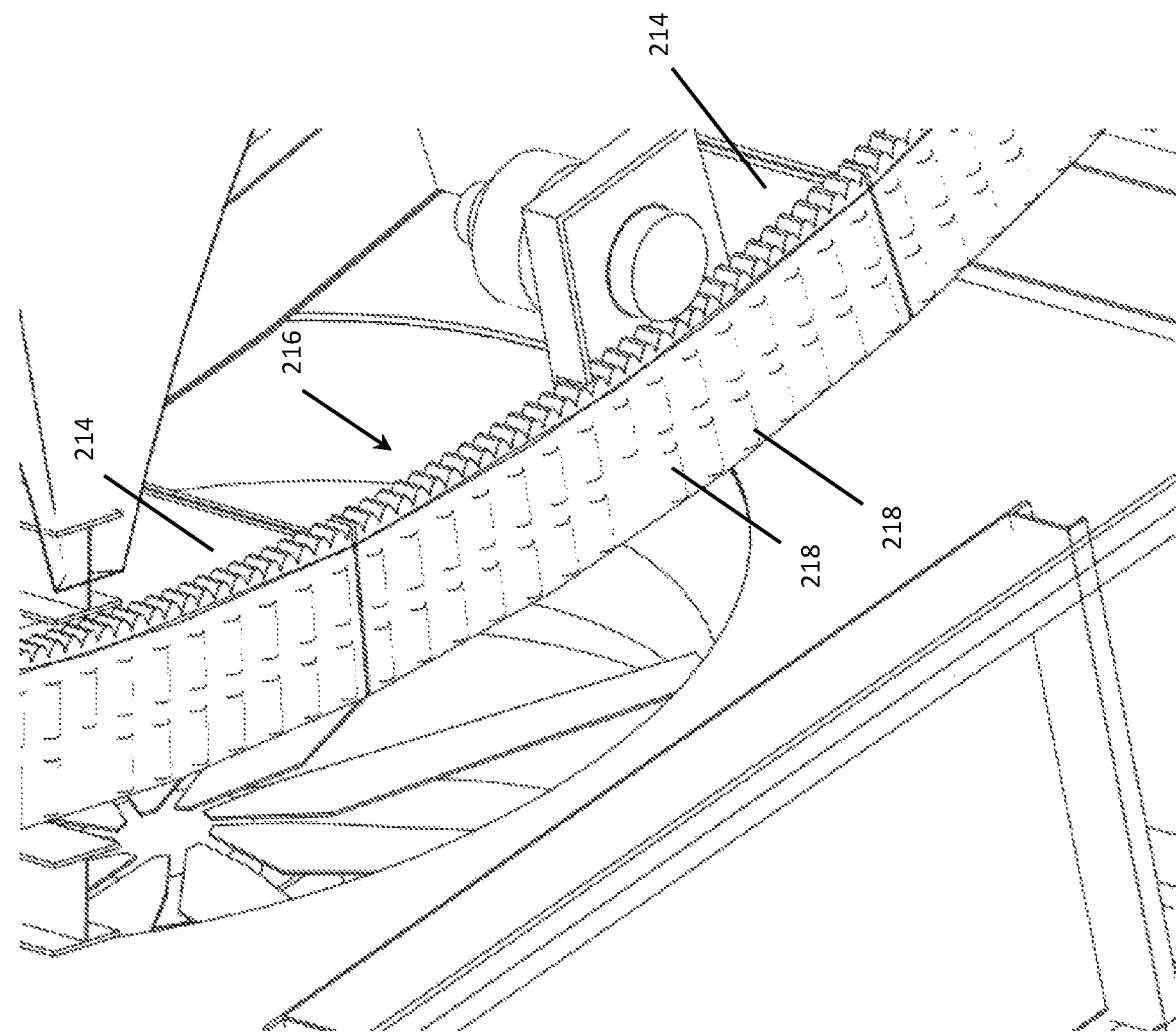

With reference to FIG. 3, depicted is a bottom support structure for the hoop structure 202. The bottom support structure 216 supports the weight of grid of the hoop structure 202 described above and directly contacts the ground. In some embodiments, the ground surface may be a cement foundation. In some embodiments, the ground surface may be another type of foundation, such as for example, a steel foundation or 316 stainless steel foundation. The bottom support structure 216 includes one or more rollers 218 that allow the hoop structure 202 to rotate around the DAC structure 100. In some embodiments, rollers 218 may be cylindrical rollers. In some other embodiments, rollers 218 may be ball type (e.g., sphere shaped) rollers.

Returning to FIG. 2, the interior support structure 204 includes horizontal support members 220 and vertical support members 222. The interior support structure 204 provides support and guidance for the hoop structure 202. In the depicted embodiment, the horizontal support members 220 extend from a first vertical support member 222 to a second vertical support member 222. The horizontal support members 220 may be fastened to the vertical support members 222 using any available technique. For example, each horizontal support member 220 may be fastened to a vertical support member 222 by welding, riveting, and/or bolting the horizontal support member 220 to the vertical support member 222.

The horizontal support members 220 have a length 220L in the horizontal direction. In some embodiments, the length 220L may be about 2 m to about 9 m, though larger and smaller values are contemplated. In some embodiments, the length 220L may be about 4.5 m. The vertical support members 222 have a height 222H in the vertical direction. The vertical supports 222 may extend from the horizontal supports 220 to the ground. In some embodiments, the height 222H may be about 5.7 m to about 19.6 m, though larger and smaller values are contemplated. In some embodiments, the height 222H may be about 10 m. The height 222H may be greater than the height 202H of the hoop structure 202. In some embodiments, interior support structure 204 may be absent across from fan panel 116.

The exterior support structure 206 includes horizontal support members 224 and vertical support members 226. The exterior support structure 206 provides support and guidance for the hoop structure 202. In the depicted embodiment, the horizontal support members 224 extend from a first vertical support member 226 to a second vertical support member 226. The horizontal support members 224 may be fastened to the vertical support members 226 using any available technique, similar to those discussed above with respect to the interior support structure 204.

The horizontal support members 224 have a length 224L in the horizontal direction. In some embodiments, the length 224L may be about 3 m to about 10 m, though larger and smaller values are contemplated. In some embodiments, the length 224L may be about 5 m. The vertical support members 226 have a height 226H in the vertical direction. The vertical supports 226 may extend from the horizontal supports 224 to the ground. In some embodiments, the height 226H may be about 5.7 m to about 19.6 m, though larger and smaller values are contemplated. In some embodiments, the height 226H may be about 10 m. The height 226H may be greater than the height 202H of the hoop structure 202.

Figure 4:
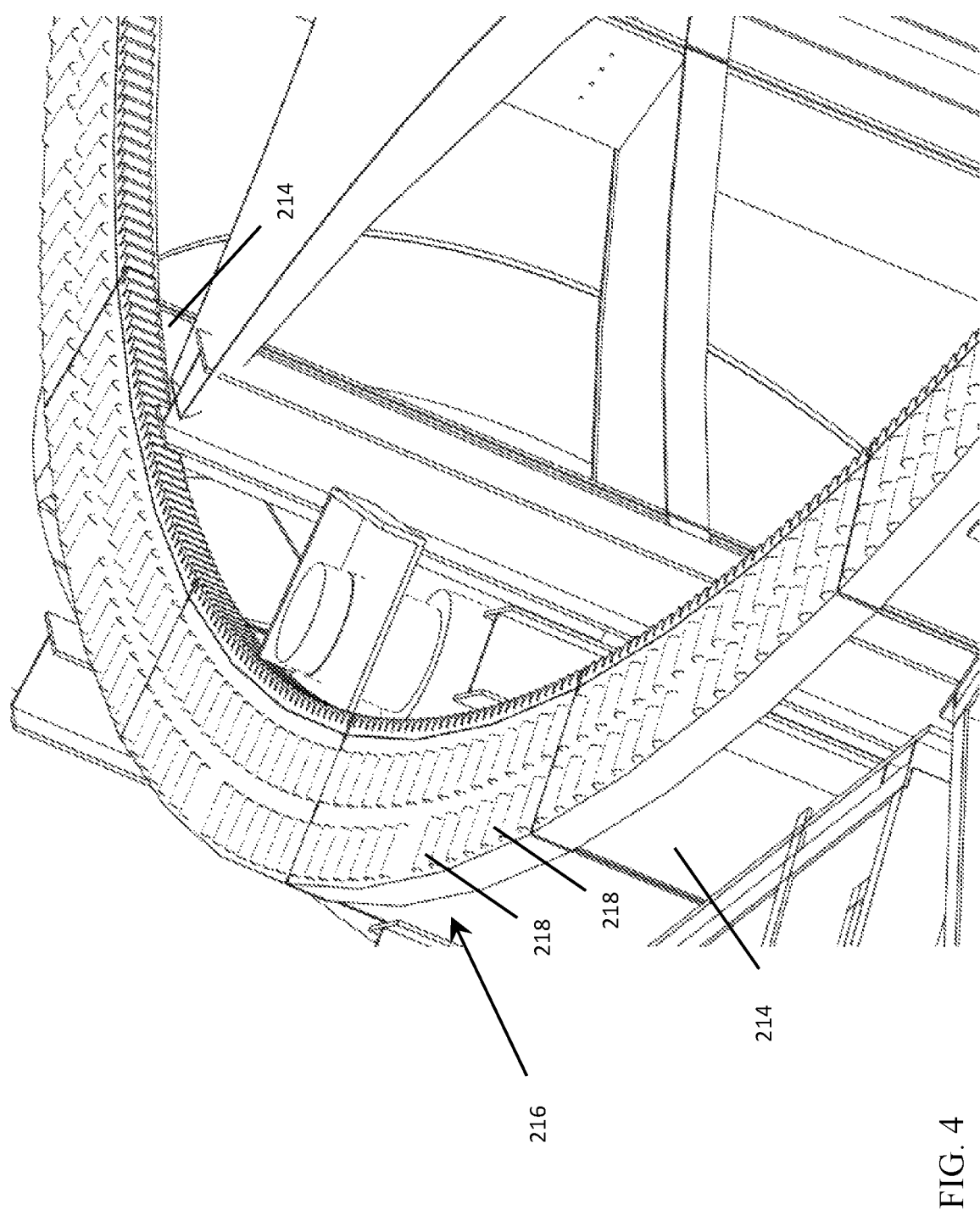

Some implementations include one or more roller guide mechanisms that guide the hoop structure 202 as it rotates around the DAC structure 100. The roller guide mechanism may include one or more rollers 218 (FIG. 3 or 4) disposed on vertical support members 226 (FIG. 2) of the exterior support structure 206 and/or the vertical support members 222 (FIG. 2) of the interior support structure 204. In some implementations, the interior support structure 204 uses the roller guide mechanism to support and guide the hoop structure 202 as it rotates. The roller guide mechanism may be mounted to the vertical support structure 222 by welding, riveting, bolting, and/or other fasteners. The roller 218 may be supported by the vertical support structure and may rotate freely. Depending upon the implementation, the roller 218 may be held in place by a pin or other support. Each interior vertical support member 222 may include one or more roller guide mechanisms at various positions along the height 222H of the vertical support member 222.

In some embodiments, a roller guide mechanism may be placed at positions that correspond to the heights of the bottom frame 212 and top frame 210 of each frame 208 of the hoop structure 202. In some embodiments, fewer roller guide mechanisms may be placed. In some other embodiments, the roller guide mechanisms may be placed on the vertical support members 226 of the exterior support structure 206. In yet other embodiments, roller guide mechanisms may be placed on interior vertical support members 222 and exterior vertical support member 226.

Figure 5:
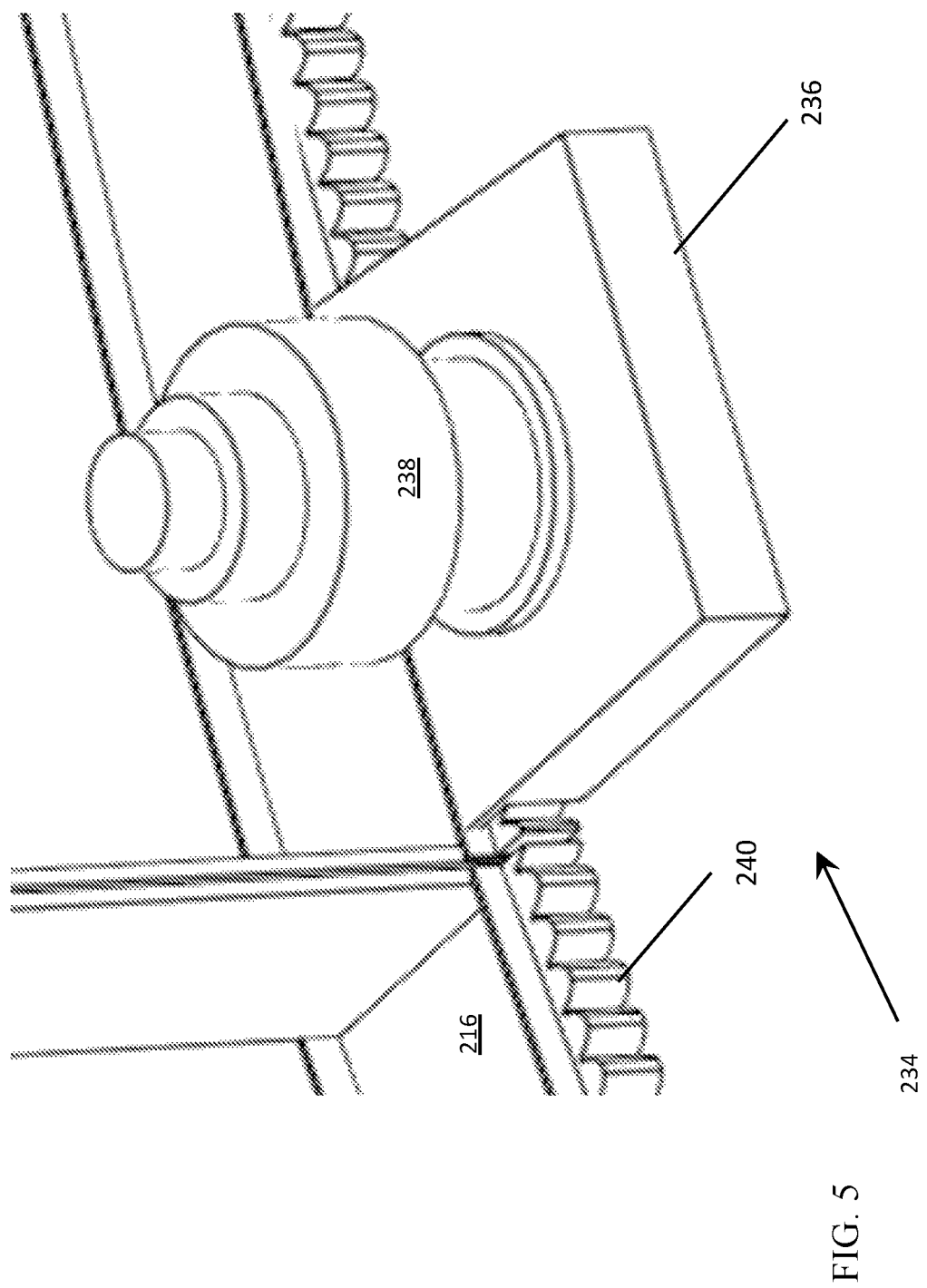
Figure 6:
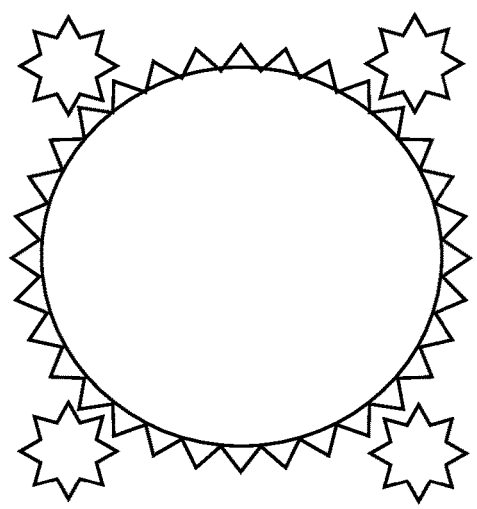

FIG. 5 depicts an exemplary drive mechanism 234 for rotating the hoop structure 202. The drive mechanism 234 may include a base 236 and a motor 238 and may be secured to the floor to rotate the hoop structure 202. The base 236 may include gears for interfacing with and driving drive teeth 240 of the hoop structure 202. The base 236 may include additional gearing to improve the torque of the motor 238. The motor 238 may be an electric motor. In some embodiments, the drive mechanism 234 may be a yaw gear and drive system, such as yaw drive mechanism 600 depicted in FIG. 6. In some embodiments, the drive mechanism 234 may be a rack and pinion drive system.

In some embodiments, the drive mechanism 234 may be secured to a vertical support member 222 of the interior support structure 204. There may be multiple drive mechanisms 234 spaced around the interior of the hoop structure 202. In some embodiments, there may be between two and eight drive mechanisms 234. In some embodiments, there may be four drive mechanisms 234 equally spaced around the interior of the hoop structure 202 and configured to mechanically convey the hoop structure 202.

In some other embodiments, the drive mechanism 234 may be secured to a vertical support member 226 of the exterior support structure 206. There may be multiple drive mechanisms 234 spaced around the exterior of the hoop structure 202. In some embodiments, there may be between two and eight drive mechanisms 234. In some embodiments, there may be four drive mechanisms 234 equally spaced around the exterior of the hoop structure 202 and configured to mechanically convey the hoop structure 202. In some other embodiments, the drive mechanism 234 may be secured to a vertical support member 226 of the exterior support structure 206 and vertical support member 222 of the interior support structure 204. There may be multiple drive mechanisms 234 spaced around the exterior and interior of the hoop structure 202. In some embodiments, there may be between two and eight drive mechanisms 234. In some embodiments, there may be four drive mechanisms 234 equally spaced around the interior and exterior of the hoop structure 202 and configured to mechanically convey the hoop structure 202.

The Air Diverter

The air diverter 126 helps remove the processed air from the DAC structure 100 by redirecting the processed air entering the DAC structure 100 upward so that the processed air does not stay inside the DAC structure 100 but is instead effectively and efficiently removed from the structure through the opening in the roof structure 104. The air diverter 126 may reduce turbulence and decrease the pressure drop of the air allowing more air to be moved per unit pressure drop. It also minimizes the amount of land used to prevent cross circulation of processed air into the fans.

Figure 7:
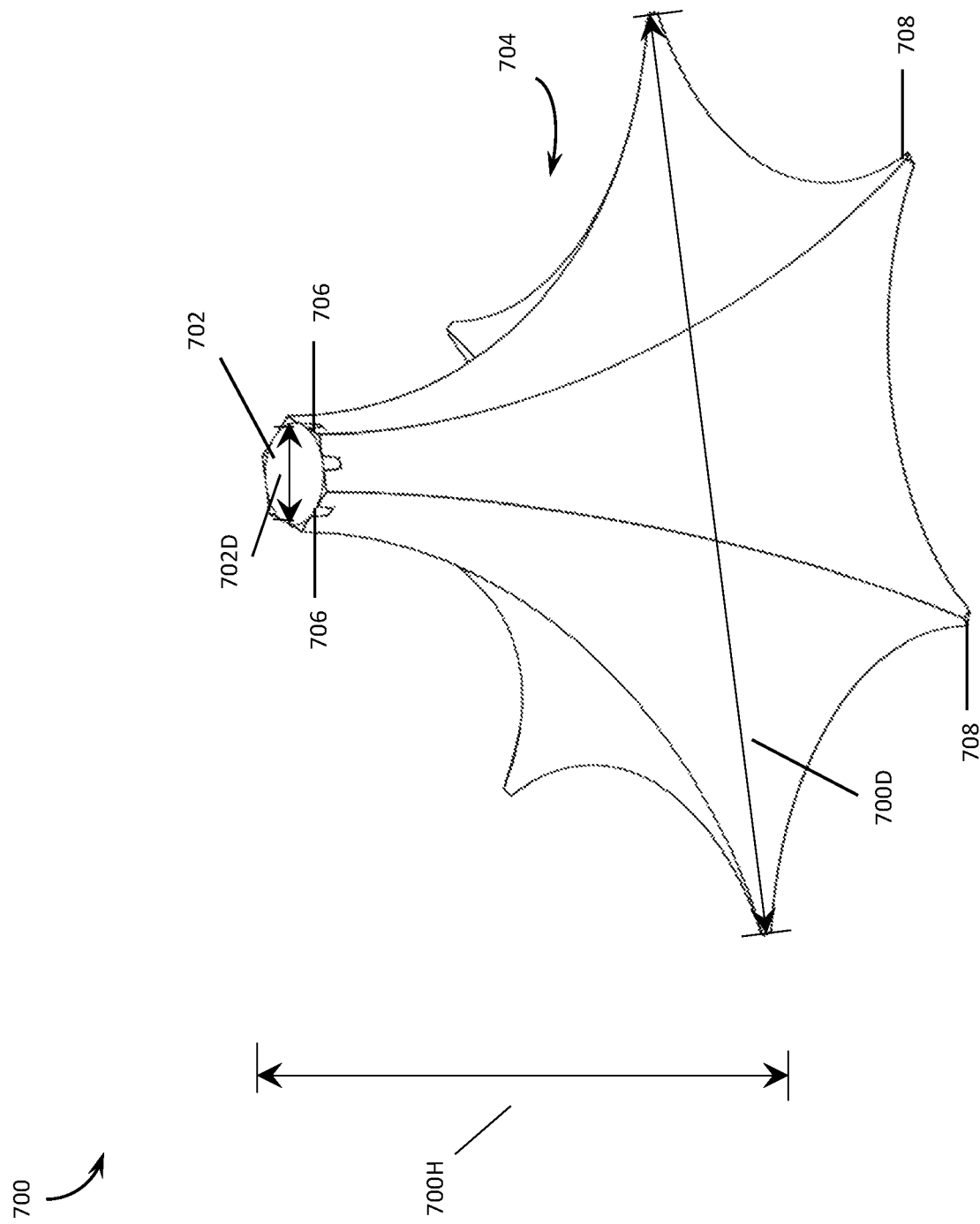
FIGS. 7-8 are perspective illustrations of an exemplary diverter of an atmospheric carbon dioxide removal structure, according to some embodiments of the present disclosure.
Figure 8:
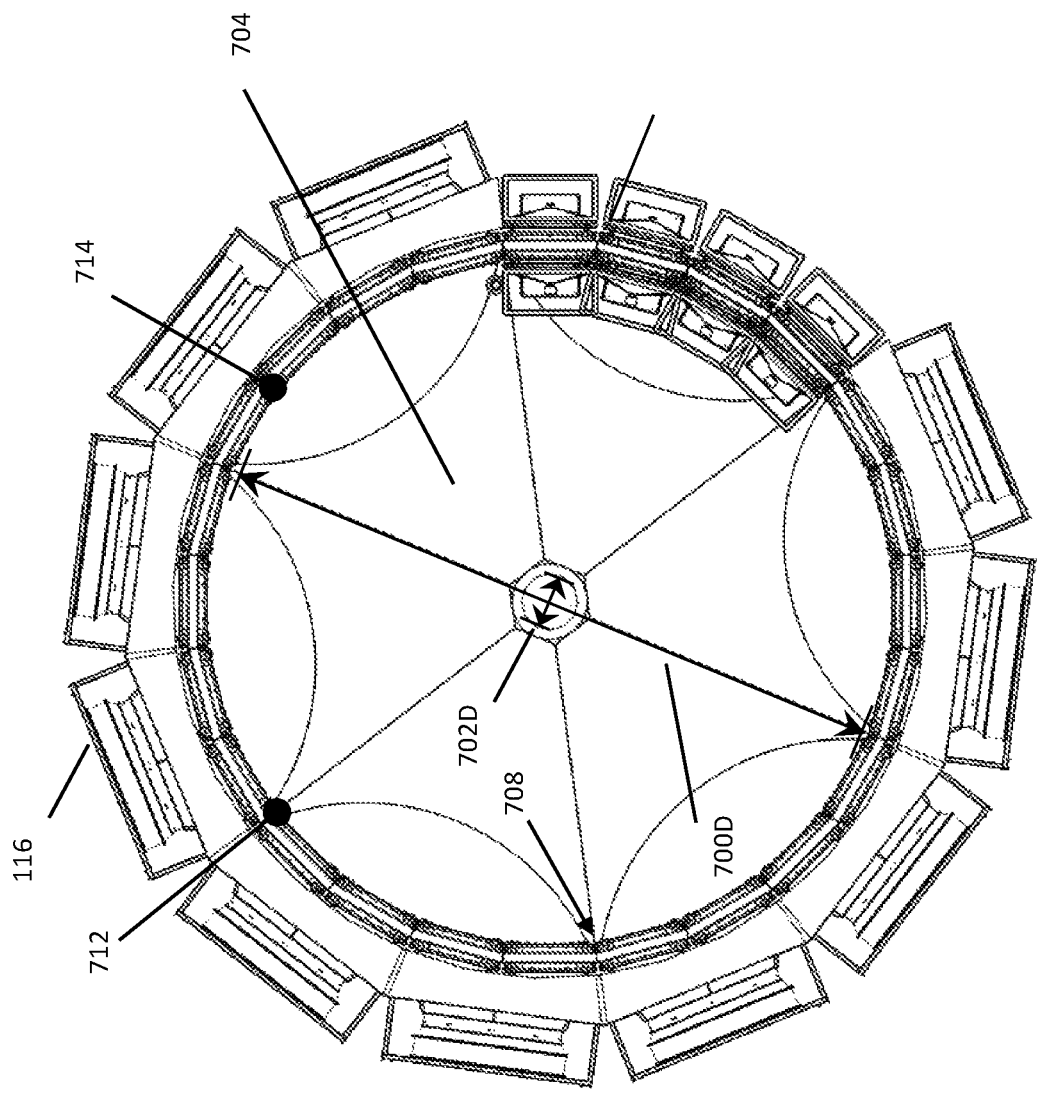

With reference to FIGS. 7 and 8, further depictions of the air diverter 126 are provided. Diverter 700, also referred to as an air diverter and which may correspond to the air diverter 126, may include a center support structure 702 and a body 704 that is anchored to the center support structure 702 at upper anchor points 706 and anchored to the floor at lower anchor points 708. The body 704 of diverter 700 provides a surface for deflecting air entering the DAC structure 100 upward in order to remove the air from DAC structure 100 and avoid recirculating the same air through DAC structure 100. That is, the air enters the DAC structure 100 in a first direction (e.g., horizontal) and the diverter 700 redirects the air to flow in a second direction that is angled upwardly from the first direction. The body 704 should be made of a material that is able to redirect the incoming air stream upward. In some embodiments, the body 704 may be made of a canvas or plastic material that, when stretched, provides the appropriate surface to deflect the air. In some embodiments, the body 704 may be made of a molded material that provides the proper shape needed to redirect, or divert, the air. The molded material may be made of a plastic, a metal, a polycarbonate, and/or another suitable material.

Structure and support for the body 704 may be provided by the center support structure 702, including upper anchor points 706, and the lower anchor points 708. In some embodiments, the center support structure 702 may be a pole that may be anchored to the floor. In some embodiments, the center support structure 702 may be a ring that may be suspended from above. The body 704 may be anchored to the center support structure 702 at upper anchor points 706. Each body section 710 may be anchored individually to the center support structure 702.

The diameter of the diverter 700 determines when air entering the DAC structure 100 begins to be diverted upward. Similarly, the diameter of the center support structure 702 determines how quickly the air must be diverted upward. The diverter 700 may be operably designed to maximize the efficiency of redirecting the air upward while minimizing turbulence within the air.

Accordingly, the diverter 700 may have a diameter of 700D, or cross-sectional width, and the center support structure may have a diameter of 702D, or cross-sectional width. Lower anchor points 708 may be positioned around the interior circumference of, and adjacent to, the interior support structure 404 such that the diameter 700D of the diverter 700 is about equal to the diameter of the interior support structure 204. In some embodiments, where the interior support structure 106 is absent, the diameter 700D is about equal to the diameter of the hoop structure 202. In some embodiments, the diameter 700D may be about 10 m to about 36 m, though larger and smaller values are contemplated. The diameter 702D of the center support structure 702 may be about 0.5 m to about 2 m. In some embodiments, the diameter 702D may be about 1 m. In some embodiments, the lower anchor points 708 may be located at a point between two fan panels 116 (e.g., point 712). In some embodiments, the lower anchor points 708 may be located at a point in the middle of a fan panel 116 (e.g., point 714).

The height of the diverter 700 also affects the turbulence of the air as it leaves the interior of the DAC structure 100. The height of the diverter 700 may be designed to work with the diameter 700D to maximize the efficiency of removing the air from the DAC structure 100 and minimizing the turbulence of the air flow. Accordingly, diverter 700 has a height 700H that is about 4 m to about 19 m, though larger and smaller values are contemplated. In some embodiments, height 700H is about 10 m. In some embodiments, the height of diverter 700 is adjustable so that the air flow may be properly directed according to the height.

The Velocity Stack

Figure 9:
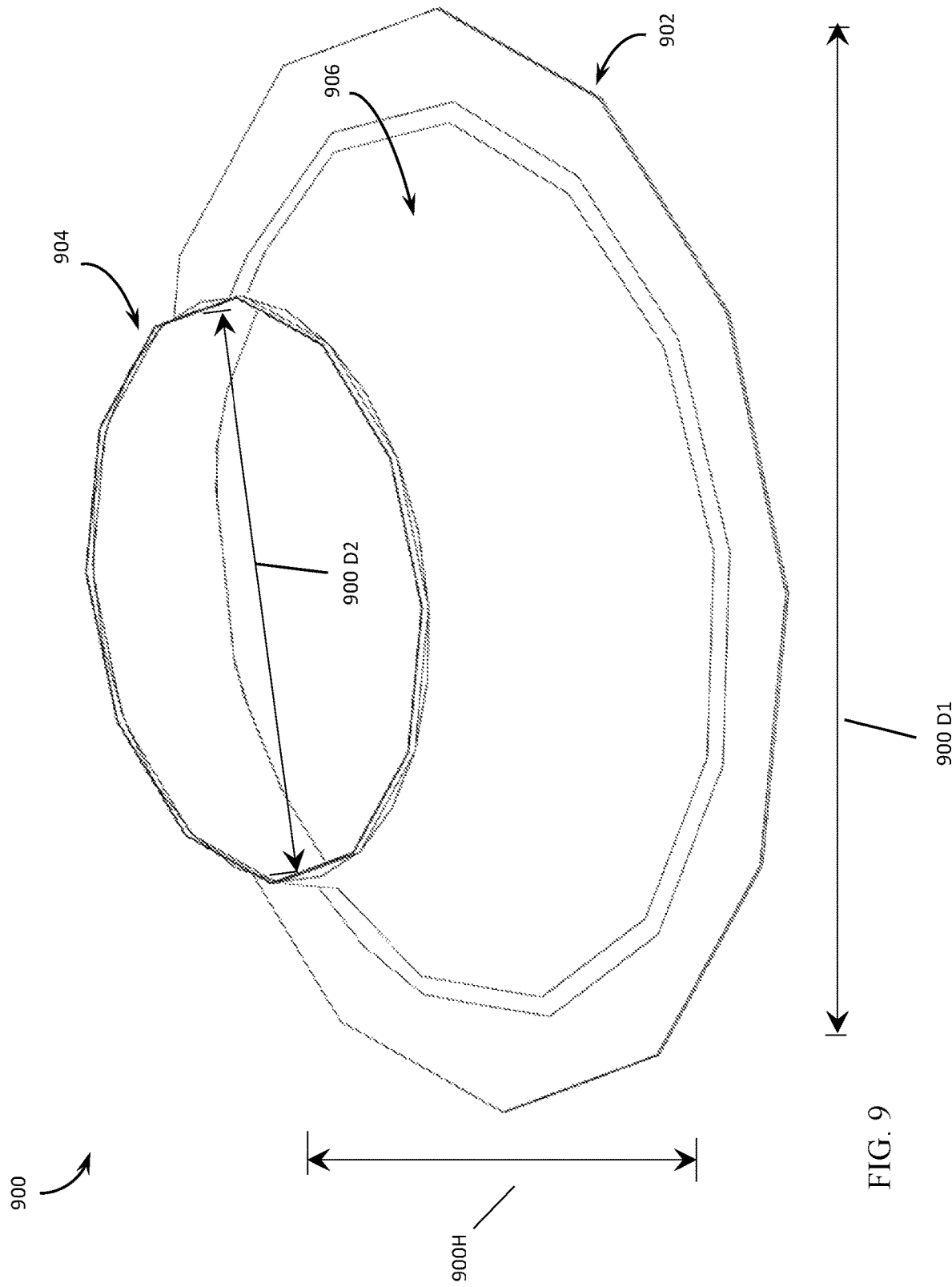
FIG. 9 is a perspective illustration of an exemplary velocity stack of an atmospheric carbon dioxide removal structure, according to some embodiments of the present disclosure.
Figure 10:
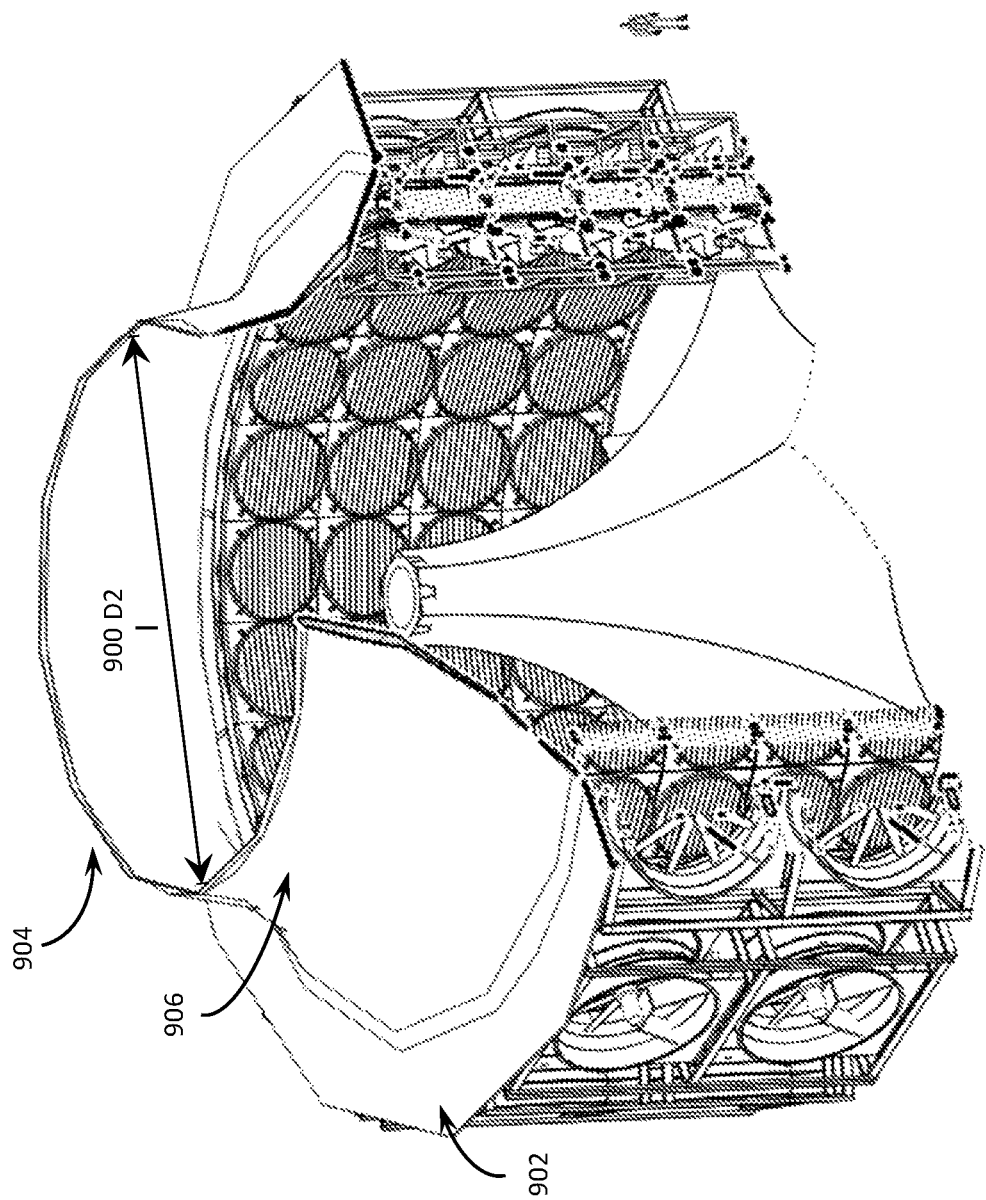
FIG. 10 is an illustration of a partial sectional view of an exemplary velocity stack of an atmospheric carbon dioxide removal structure, according to some embodiments of the present disclosure.

FIGS. 9 and 10 depict the velocity stack 124, referenced in these figures by the reference number 900, according to various embodiments of the present disclosure. The velocity stack functions to remove the processed air from the DAC structure 100 so that the air is not recirculated through the DAC structure 100. The air that is redirected upward by the diverter 700 passes through the velocity stack 900 to exit out of the top of the DAC structure 100. The velocity stack is designed to be wider at the bottom than at the top so that the air is accelerated as it passes through the velocity stack. Depending on the implementation, the DAC structure may force the air exiting through the velocity stack to achieve heights about 50 and 300 m, although higher and lower heights are contemplated. In some implementations, the air may reach a height of about 125 m to about 205 m depending on the fan speed and design of the diverter 700 and velocity stack 900. Moving the carbon dioxide depleted air to these heights helps ensure that the air is not recirculated through the DAC structure 100. The efficiency of the DAC structure 100 is improved by not recirculating air that has already been processed, thereby ensuring maximum carbon dioxide extraction from the surrounding air.

The velocity stack 900 has a bottom diameter 900D1 that is greater than a top diameter 900D2. The bottom diameter 900D1 may be about the same diameter 108D of the hoop structure 108, about 10 m to about 40 m, though larger and smaller values are contemplated. The top diameter 900D2 may be about 5 m to about 30 m, though larger and smaller values are contemplated. In some embodiments, a top diameter 900D2 may be about 70% of the hoop diameter 108D, or about 14 m to maximize vertical throw with nominal pressure drop. The height 900H of the velocity stack may be about 3.6 m to about 12.1 m, though larger and smaller values are contemplated. In some embodiments, the height 900H of the velocity stack may be about 6.3 m.

Velocity stack 900 has a body portion 906 that extends from bottom portion 902 to top portion 904. Body portion 906 may be made of a metal such as aluminum or stainless steel. In some embodiments, body portion 906 may be made of a plastic material, a molded material, or a taut canvas. The body portion 906 may extend inward and upward from bottom portion 902 creating a curvilinear slope. This shape allows air to enter the bottom portion 902 that has a larger opening and forces the air to exit the top portion 904 that has a smaller opening. This restriction forces the air to move gradually faster as it exits the DAC structure 100 thereby throwing the air higher above the ground and creating a momentum induced vacuum in the interior of DAC structure 100, which may improve the hydraulic efficiency of DAC Structure 100. Therefore, the air that was just processed and removed from the DAC structure 100 will be less likely to be processed again by the DAC structure 100.

The Carbon Capture Cylinder

The Cell Frame and Cylinder

Figure 11A:
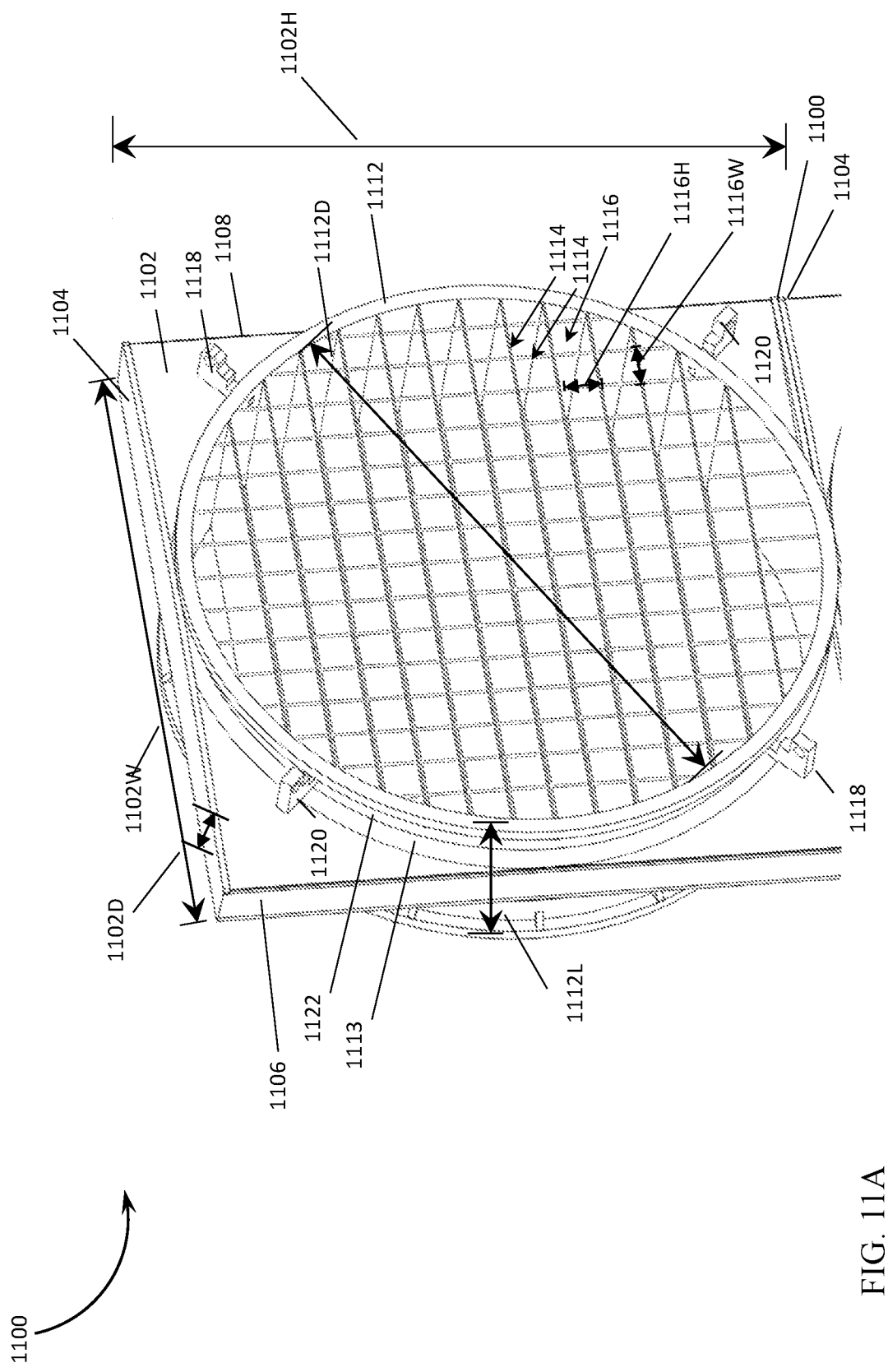
FIGS. 11A-11D and 12 are perspective illustrations of an exemplary carbon capture media cylinder of an atmospheric carbon dioxide removal structure, according to some embodiments of the present disclosure.

With respect to FIG. 11A, there is depicted a perspective view of a carbon capture media container according to some embodiments of the present disclosure. The carbon capture media container 1100 may be an example of square cell 112 discussed above with respect to FIGS. 1A-1D. The carbon capture media container 1100, also referred to as a carbon capture vessel, includes a frame 1102 having a top surface 1104, a first side surface 1106, a second side surface 1108, and a bottom surface 1110. In some example implementations, the frame 1102 has a depth 1102D, a width 1102W, and a height 1102H, although the sizes can vary. Depending upon the implementation, the depth 1102D may be about 0.1 m to about 1 m, though larger and smaller dimensions are contemplated. In some embodiments, the depth 1102D may be about 0.15 m. The width 1102W may be about 1.5 m to about 5 m, though larger and smaller dimensions are contemplated. In some embodiments, the width 1102W may be about 2.5 m. The height 1102H may be about 1.5 m to about 5 m, though larger and smaller dimensions are contemplated. In some embodiments, the height 1102H may be about 2.5 m.

The frame 1102 may include a cylinder 1112. Cylinder 1112 may be an example of carbon capture cylinder 114 discussed about with respect to FIGS. 1A-1D. Cylinder 1112 may have a diameter 1112D and a length 1112L. The diameter 1112D may be about 1 m to about 5 m, though larger and smaller dimensions are contemplated. In some embodiments, the diameter 1112D may be about 2.5 m. The length 1112L may be about 0.15 m to about 3 m, though larger and smaller dimensions are contemplated. In some embodiments, the length 1112L may be about 0.7 m.

The cylinder 1112 may have an opening at each end of the cylinder and a sidewall 1113 extending between each opening, forming the body of the cylinder 1112. The cylinder 1112 may include sorbent material separation elements 1114 to form a sorbent material sub container 1116 for holding and supporting the sorbent material in a portion of the cylinder 1112.

The sorbent material sub container 1116 may include a first set of identical elongated sorbent material separation elements 1114 that run parallel to each other in a first direction and a second set of identical elongated sorbent material separation elements 1114 that run parallel to each other in a second direction that is perpendicular to the first direction. The two sets of elongated elements may form a square grid having multiple individual grid cells 1116 that run the length 1112L. Grid cells 1116 may also be referred to as sorbent material sub containers. In some embodiments, the grid cell 1116 may be hexagonal. In other embodiments, the grid cell 1116 may be triangular. In some other embodiments, the grid cell 1116 may be circular and form a cylinder of length 1112L. Regardless of the chosen shape, each end of the sorbent material sub container 1116 may be screened or grated to retain the adsorbent porous media inside the grid while allowing air to flow through it axially with nominal resistance. Regardless of the chosen shape, the walls of the sorbent material sub container 1116 would be screened or grated to hold and support the adsorbent porous media inside the grid while allowing air to flow through it orthogonally with nominal resistance.

With respect to FIG. 11A, in the depicted embodiment, the sorbent material sub container cells 1116 have a rectangular shape. Each square grid cell 1116 has a height 1116H and a width 1116W. The grid height 1116H may be about 1 cm to about 60 cm, though larger and smaller values are contemplated. In some embodiments, the grid height 1116H may be about 25 cm. The grid width 1116W may be about 1 cm to about 60 cm, though larger and smaller values are contemplated. In some embodiments, the sorbent material sub container width 1116W may be about 25 cm.

Figure 11B:
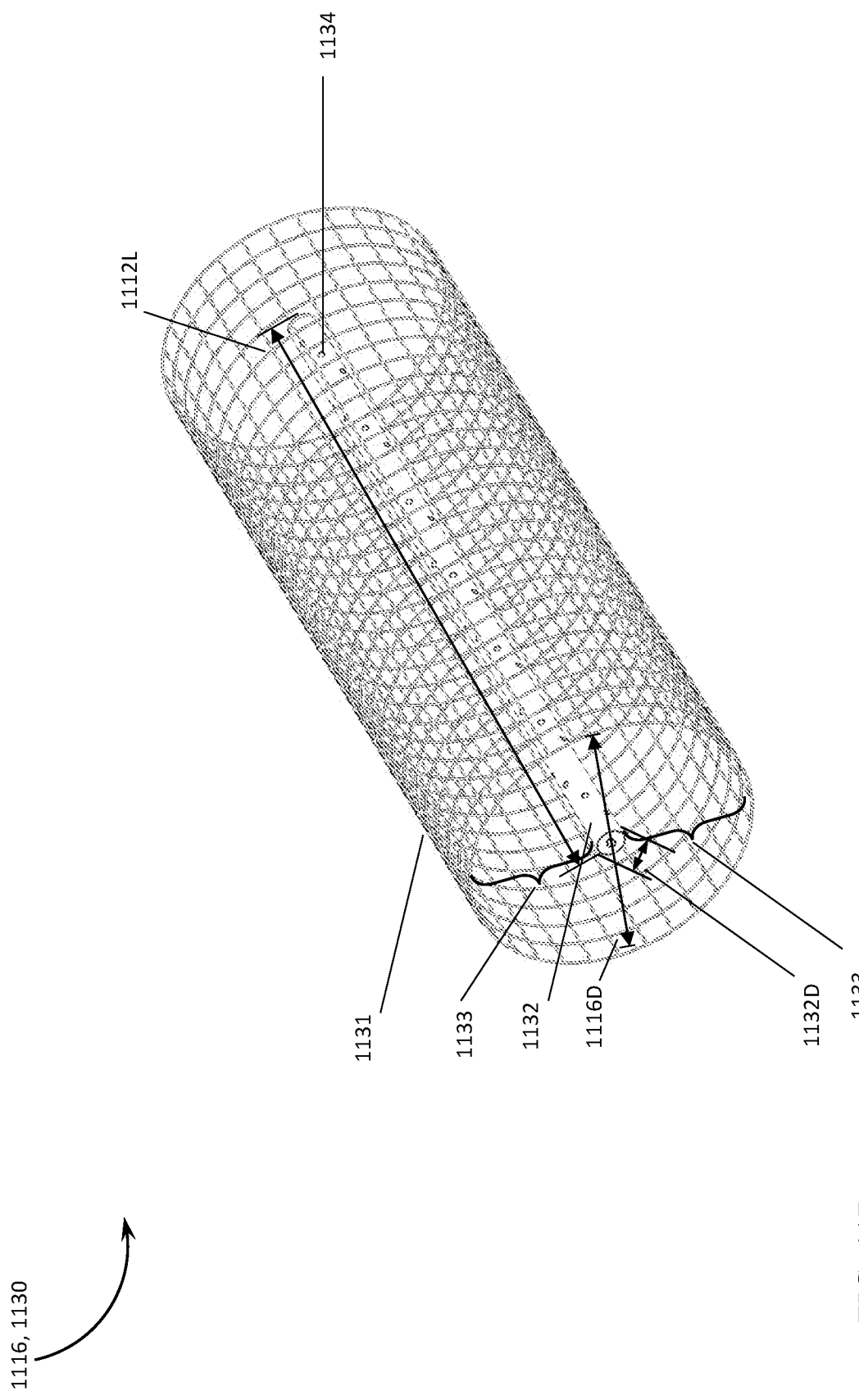

With respect to FIG. 11B, in the depicted embodiment, the sorbent material sub container 1116 may be constructed as a standalone pre-packed cylindrical cartridge 1130 to facilitate ease of loading adsorbent porous media into the carbon capture vessel and to facilitate ease of maintenance removal and replacement of adsorbent porous media from time to time. The exterior wall 1131 of a pre-packed cylindrical cartridge 1130 would be screened or grated to retain the adsorbent porous media inside the cartridge while allowing air to flow out of the cartridge radially with nominal resistance. Each circular grid cell 1116 has a diameter of 1116D. The grid diameter 1116D may be about 1 cm to about 60 cm, though larger and smaller values are contemplated. In some embodiments, the grid diameter of 1116D may be about 25 cm.

In some embodiments, at the center of each standalone pre-packed cylindrical cartridge 1130 is a tube 1132 that runs the length 1112L and may be supported in the center of cartridge by any suitable manner. Sorbent material would be placed in the annulus 1333 between tube 1132 and exterior wall 1131 of cylindrical cartridge 1130. The end of tube 1132 that faces a fan panel 116 would be open to allow air flow into the tube along its axis. The end of tube 1132 that faces the interior of the DAC structure 100 would be plugged. The tube diameter 1132D may be between 1 cm and 10 cm, though larger and smaller values are contemplated. In some embodiments, tube diameter 1115D may be about 2.5 cm.

Along the axis of tube 1132, the tube is either perforated with apertures such as holes 1134 or slots to allow bulk air flow in all radial directions away from tube 1132, for radial propagation through the sorbent materials inside the standalone pre-packed cylindrical cartridge 1130, and out exterior wall 1131 with nominal pressure drop.

Figure 11C:
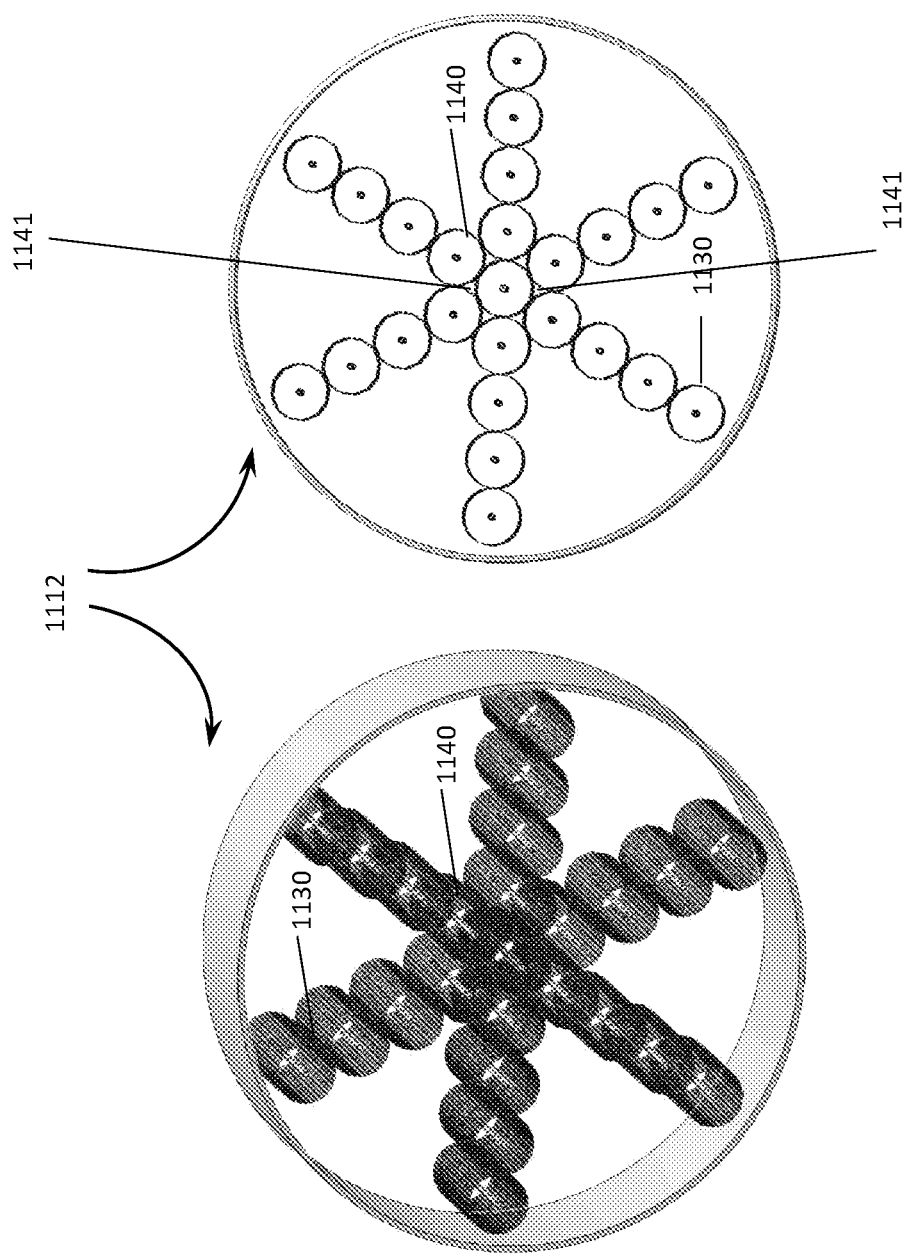
Figure 11D:
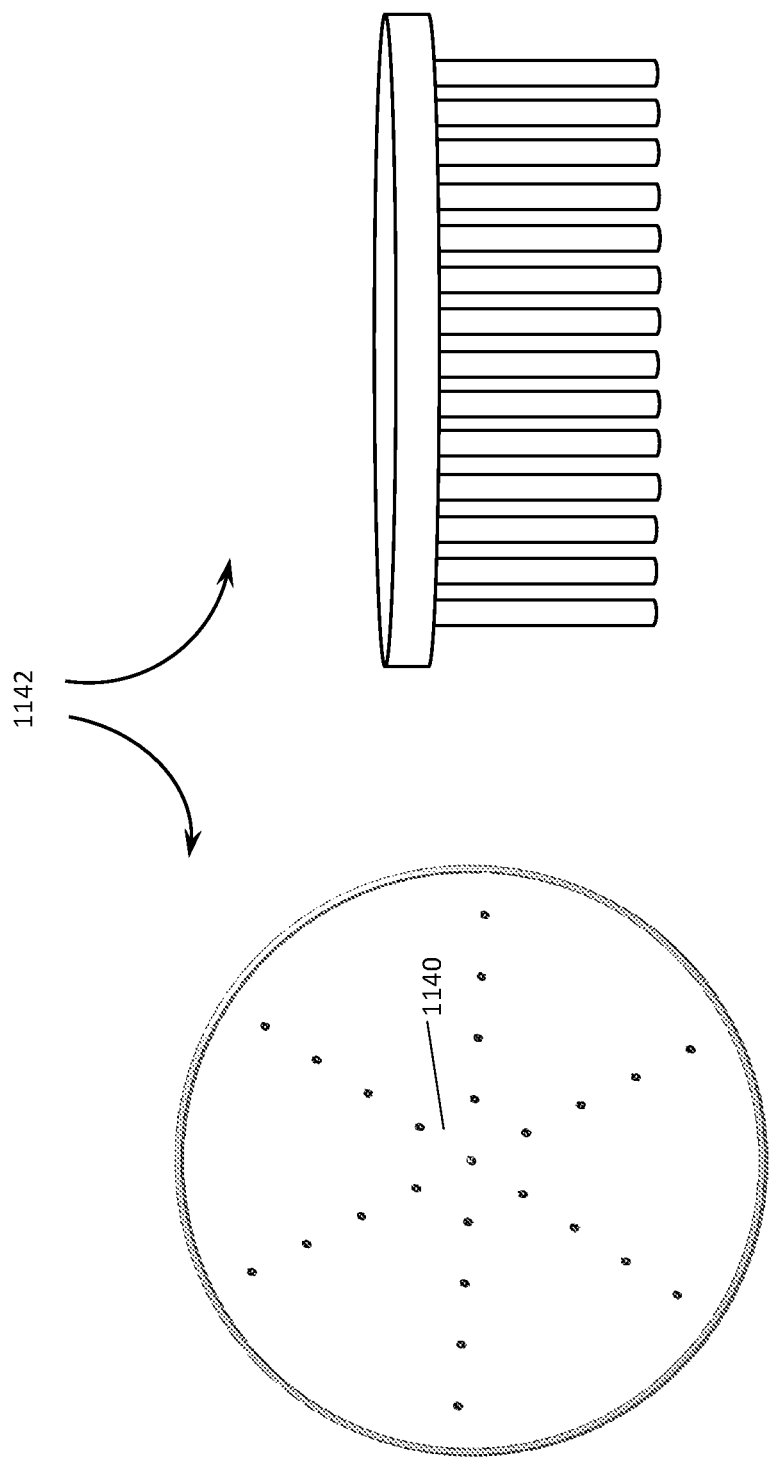

With respect to FIG. 11C, in the depicted embodiment, standalone pre-packed cylindrical cartridges 1130 are arranged in an array pattern 1140 inside cylinder 1112 to create an open annular space 1141 between the cylindrical cartridges 1130 that are placed inside cylinder 1112 (for convenience, only a portion of the array pattern 1140 is displayed). Open annular space 1141 serves as an exhaust pathway to evacuate processed air into the interior of the DAC structure 100 as it radially exits exterior wall 1131. With respect to FIG. 11D, at the end of cylinder 1112 that faces fan panel 116, a radial flow enabler lid 1142 is installed to direct air flow into tubes 1132 and prevent unprocessed air flow from entering the open annular space 1141 (for convenience, only a portion of the array pattern 1140 is displayed). Lid 1142 is fitted with tubing of a sufficient length and having an outside diameter slightly smaller or larger than the interior diameter of tube 1132 to cause air flow to flow exclusively into tubes 1132.

Returning to FIG. 11A, the cylinder 1112 may include one or more clamp points 1118. In some embodiments, there may be four clamp points 1118, also referred to as locking points, located on an exterior surface of cylinder 1112. In some embodiments, there may be fewer than four clamp points 1118. In some embodiments, there may be more than four clamp points 1118. In some embodiments, the clamp point 1118 may have a rectangular shape. In some embodiments, the clamp point 1118 may have triangular shape. In the depicted embodiment, the clamp point 1118 has a stair like shape.

Each of the one or more clamp points 1118 may include a hole 1120 for securely clamping to the clamp point 1118. Each clamp point 1118 may be securely fixed in a trench 1122 around the circumference of the cylinder 1112. The trench 1122 may provide support and structural stability for the clamp point 1118. The clamp point 1118 may be secured to the cylinder 1112 through a hole 1120 in the cylinder 1112.

Carbon capture media container 1100, including cylinder 1112, sorbent material separation elements 1114, sorbent material sub container 1116, pre-packed cylindrical cartridge 1130, standalone exterior wall 1131, tube 1132, and radial flow enabler lid 1142 may be collectively referred to as a sorbent material holding apparatus and may be constructed from a metal or polymer that does not oxidize and does not react with the sorbent material. In some examples, the carbon capture media container 1100 is constructed of 316 stainless steel.

Figure 12:
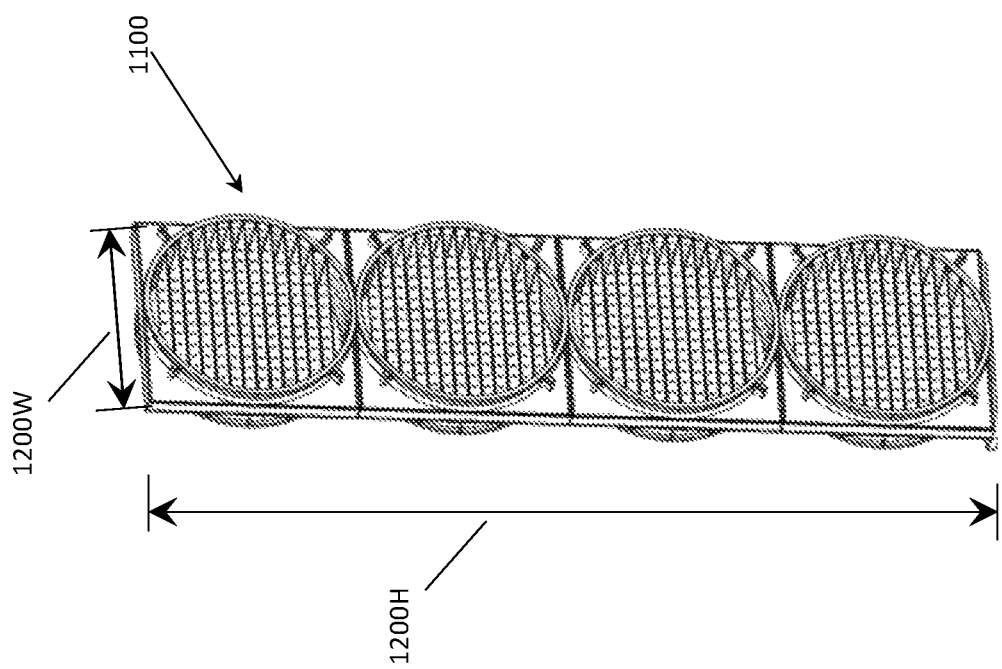

Two or more carbon capture media containers 1100 may be joined together to form a stack of carbon capture media containers, such as illustrated in FIG. 12. The stack 1200 of carbon capture media containers 1100 may be an example of the stack of four square cells 112 discussed above with respect to FIGS. 1A-1D. The stack 1200 of carbon capture containers 1100 (also referred to as frame stack 1200) has a height 1200H and a width 1200W. The frame stack height 1200H may be about 5 m to about 20 m, though larger and smaller dimensions are contemplated. In some embodiments, the frame stack height 1200H may be about 10 m. The frame stack width 1200W may be about 1.5 m to about 5 m, though larger and smaller dimensions are contemplated. In some embodiments, the frame stack width 1200W may be about 2.5 m.

The frame stack 1200 may include two or more frames 1102 (e.g., carbon capture media containers 1100) connected to each other. The frames 1102 may be connected vertically to form frame stack 1200. That is, the bottom surface 1110 of a first frame 1102 may be connected to the top surface 1104 of a second frame 1102. In some embodiments the frames 1102 may be bolted together. In some embodiments, the frames 1102 may be welded together. In some embodiments, the frame stack 1200 may include four frames 1102 connected in a vertical stack with a bottom surface of the first, second, and third frames serving as or being connected to a top surface of the second, third, and fourth frames, respectively. In the illustrated embodiment, four frames 1102 are connected to form a stack. In this embodiment, four frames 1102 are used because a frame stack 1200 having four frames 1102 may be transported using a standard flatbed trailer.

The Carbon Adsorbing Media

The cylinder 1112 of the carbon capture media container 1100 is filled with a carbon dioxide sorbent material, also referred to collectively as adsorbent porous media. The carbon capture media container 1100 is designed to be agnostic to the type of adsorbent porous media selected for use. Certain characteristics are nonetheless preferred for use in the atmospheric carbon dioxide removal DAC structure 100 to facilitate efficient advection, contact, and capture of carbon dioxide.

With atmospheric carbon dioxide levels currently under 500 ppm, the atmospheric carbon dioxide removal DAC structure 100 must handle at least 2,000 constituent molecules of air for each carbon dioxide molecule advected through the sorbent material. At today's levels, about forty-five million standard cubic feet of air must be handled to supply a single metric ton of carbon dioxide to the carbon capture media container 1100. A preferred characteristic of the sorbent material is therefore one that possesses a high relative permeability to air, to improve the carbon dioxide advection flux across it per unit pressure drop to minimize bulk airflow energy used. To achieve this, the sorbent material may be supported by or be a functional embodiment of metal organic frameworks (MOFs), zeolites, monoliths, activated carbon, fibrous sheets, fibrous matter, packed beds, sand, porous polymer networks, and/or other materials.

Another preferred characteristic of a sorbent material is one that promotes a high contact efficiency between the bulk flow of air and the surface of the sorbent material. The contacting system inside the carbon capture media container 1100 is expected to either be a conventional fixed bed configuration (comprised of random packed pellets or structured packings or other materials) or a structured fixed bed configuration (such as parallel flow monoliths or other geometrically arranged structured packing materials). A contacting system that orients air flow parallel to a structured fixed bed walls may result in laminar flow and low pressure drop at the expense of carbon dioxide slippage and low contacting efficiency. Conversely, a contacting structure that orients air flow perpendicular to the sorbent material may result in high contacting efficiency from tortuous flow, at the expense of pressure drop. Adsorbent porous media that makes use of radial flow contactors such as standalone pre-packed cylindrical cartridge 1130, dual porosity systems with hierarchical pore structures, and sorbent materials that can be engineered or tuned to optimize contacting efficiency, surface area and permeability are preferred.

Another preferred characteristic of a sorbent material is one that can be supplied at low cost and can capture carbon in an energy efficient reversible process, as measured by uptake capacity, kinetics, carbon dioxide selectivity over other gases, binding energy, regeneration energy, and extended cyclability. Amines (i.e., ammonia derivatives in which one, or more hydrogen atoms are replaced by an organic radical) are well known for having high selectivity to chemically bind carbon dioxide to it in a reversible process. The most mature application of an amine-based process is the absorption of carbon dioxide from anaerobic oil and gas production flow streams. Another proven application of amine-based absorption involves separating carbon dioxide from post-combustion flue gasses for utilization or sequestration. Post-combustion carbon capture processes do, however, suffer operationally from corrosion, solvent degradation issues and a large regeneration energy penalty. A less developed application of an amine-based process is one that physically or chemically adsorbs carbon dioxide from the atmosphere onto a porous solid material. The benefit of this approach is a lower regeneration energy penalty and potentially lower cost of operations. Many promising sorbent materials have been demonstrated by researchers. In some embodiments, amines are physically embedded in or on the underlying porous media support structure. In other embodiments, the adsorbent porous media may be of an amino polymer composition or may be prepared by grafting amine materials onto the support structure. Regardless, the carbon capture media container 1100 is designed to be agnostic to the type of adsorbent porous media to be used, provided the sorbent material possesses the preferred characteristics. As will be discussed further below, once saturated with carbon dioxide, the sorbent material will be regenerated in a unique process and the carbon capture cycle repeated.

The Fans

The Fans

Figure 13:
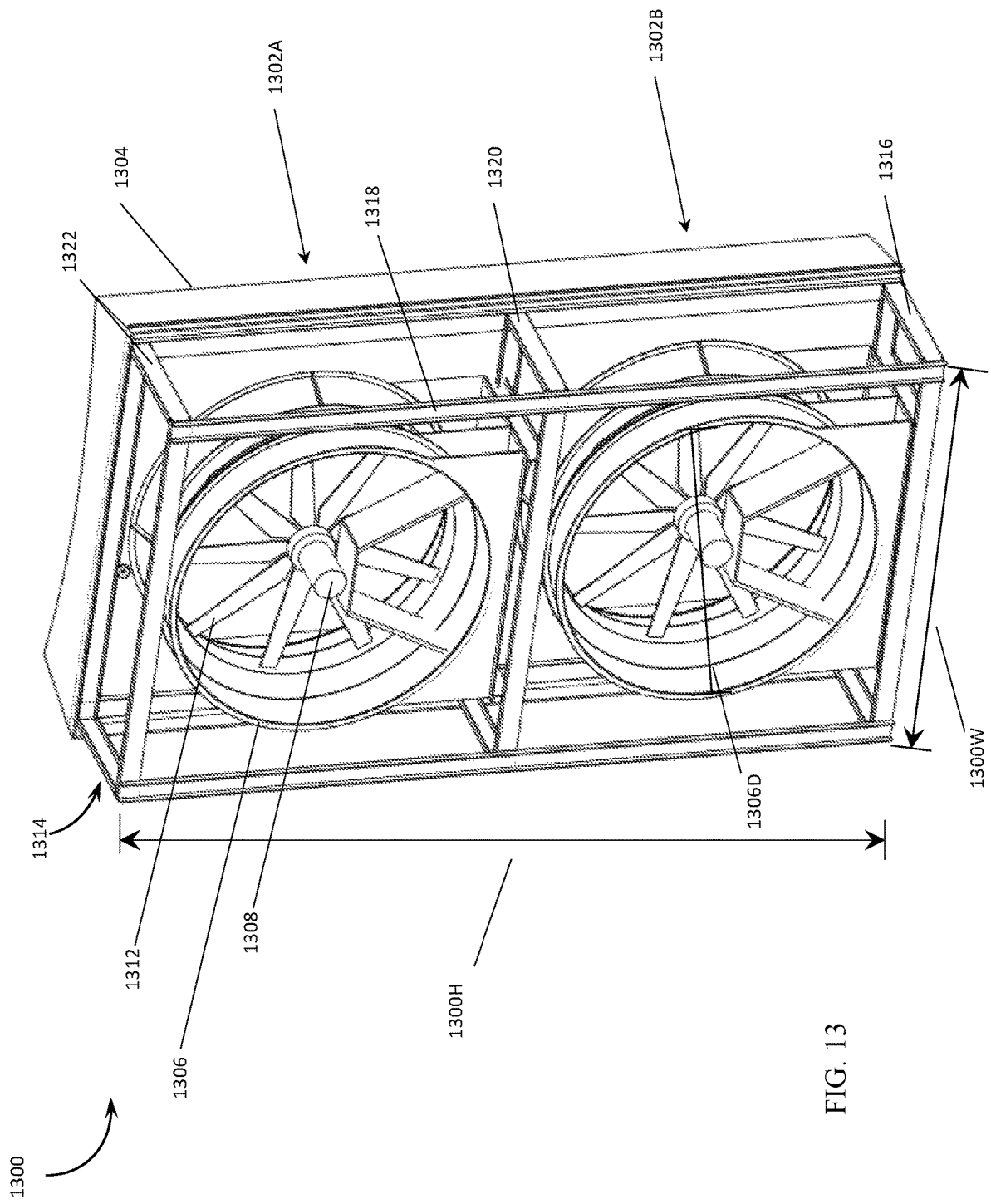
FIG. 13 is a perspective illustration of an exemplary fan panel of an atmospheric carbon dioxide removal structure, according to some embodiments of the present disclosure.
Figure 14A:
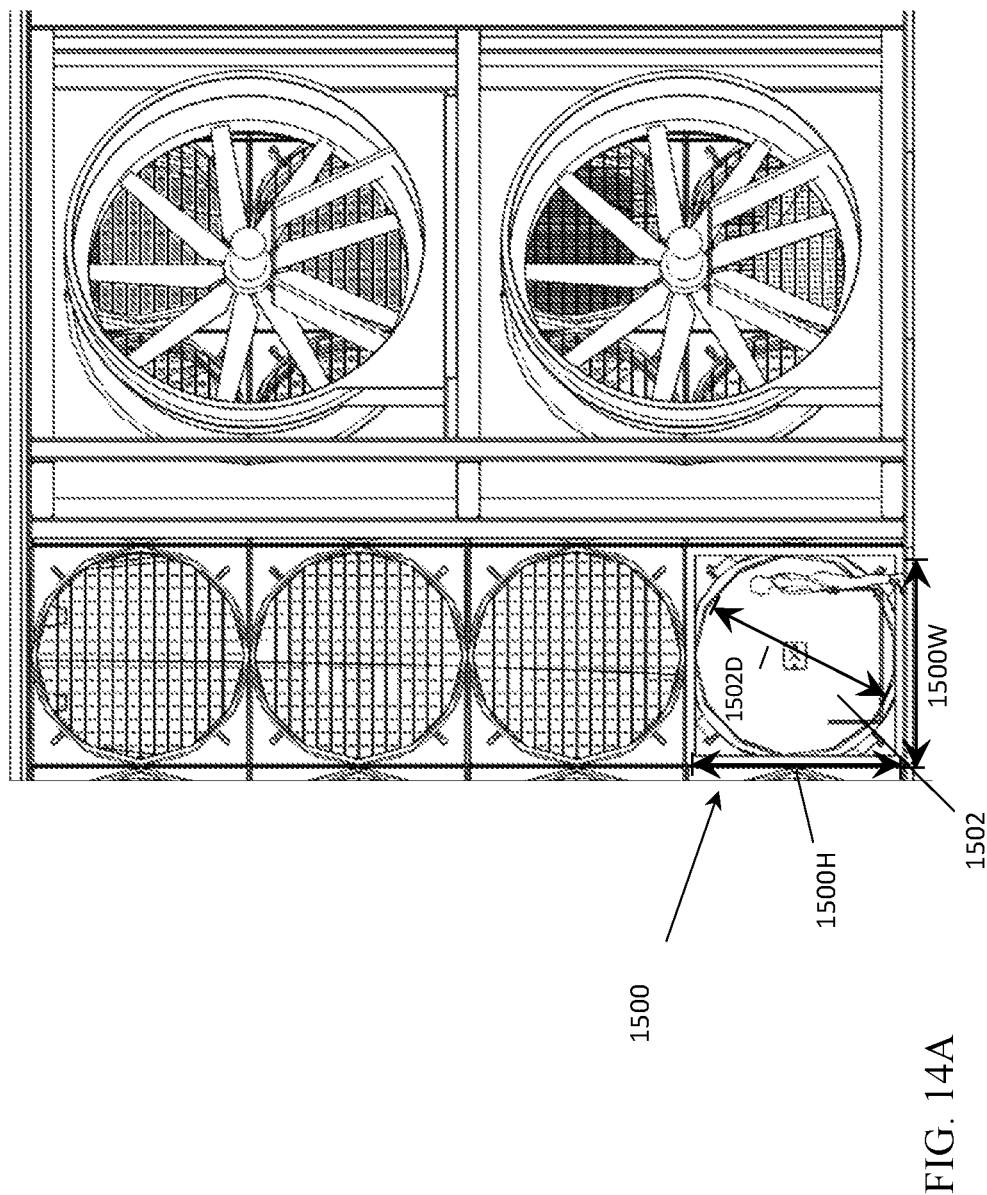
FIGS. 14A-14C and 15-17 are perspective and top-down illustrations of an exemplary regeneration structure of an atmospheric carbon dioxide removal structure, according to some embodiments of the present disclosure.
Figure 14B:
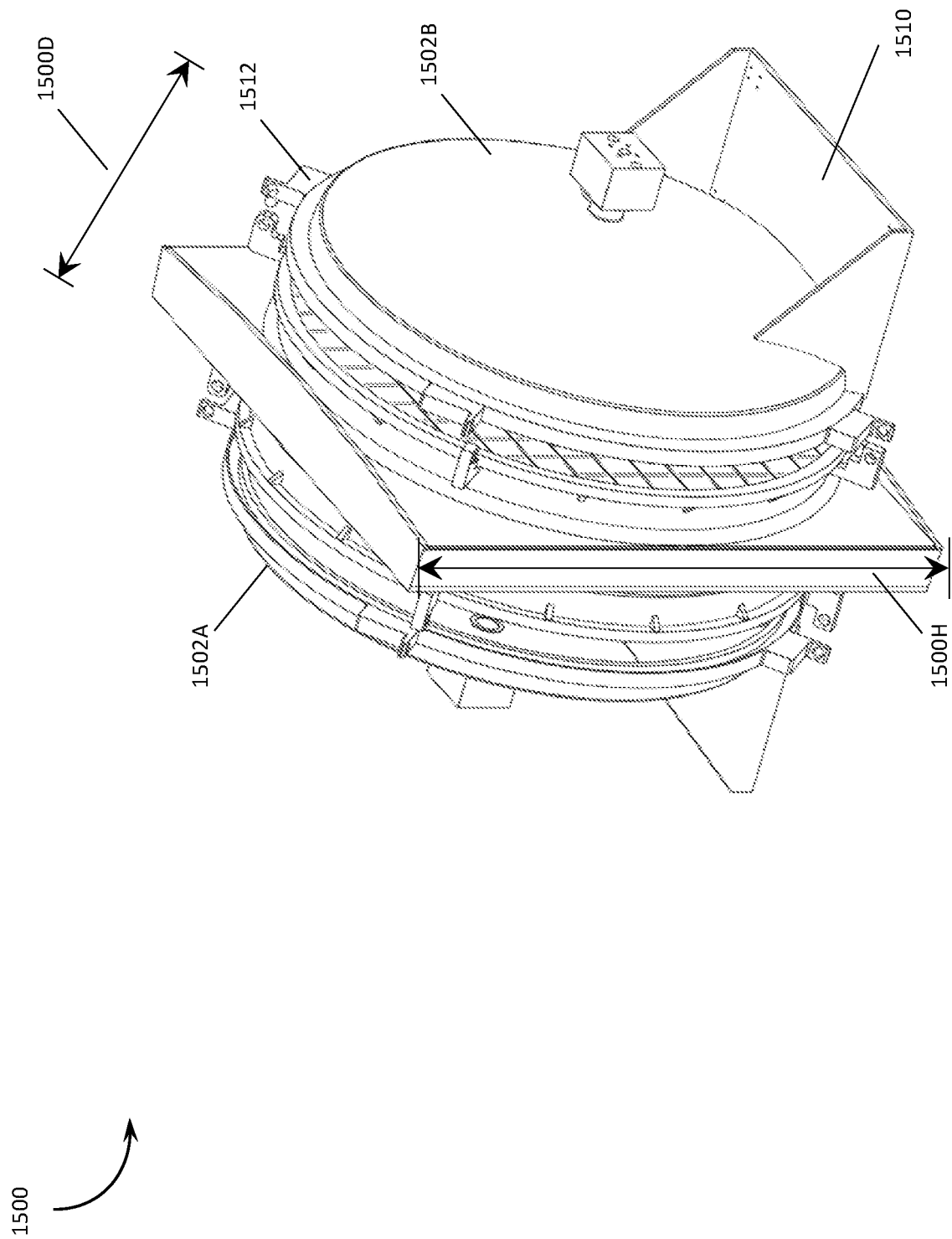
Figure 14C:
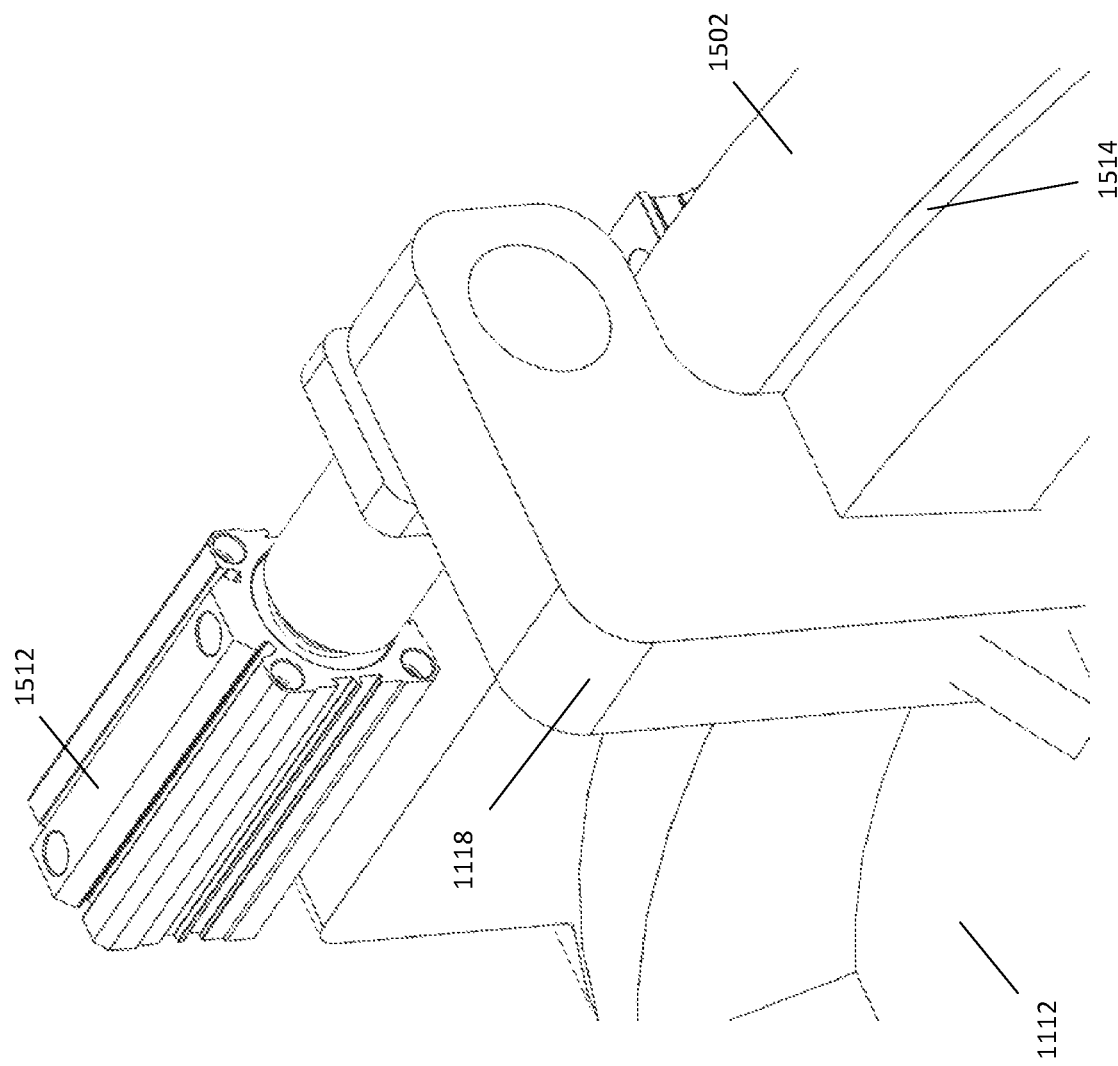

With reference to FIG. 13, depicted is an exemplary fan panel according to embodiments of the present disclosure. Fan panel 1300 provides a mechanism for effectively and efficiently forcing air containing carbon dioxide through the sorbent material to extract the carbon dioxide from the air. Fan panel 1300 may be an example of fan panel 116 described above in FIG. 1A. A goal of the fan panel 1300 is to generally drive air flow at a rate and static pressure that matches the resistance pressure presented by DAC structure 100 downstream of the fans. Accordingly, depending on a number of factors related to the design of DAC structure 100 in general and the selected adsorbent porous media in particular, fan panel 1300 can naturally pressure balance with the resistance of DAC structure 100 at fan air flow speeds of about 5 m/s to about 10 m/s, though larger and smaller values are contemplated. Depending on the fan, each fan may be configured to move air through the fan at a rate of about 100,000 cubic feet per minute (CFM) to about 250,000 CFM, though larger and smaller values are contemplated. In some embodiments, each fan may move air at a rate of about 220,000 CFM at a static pressure of about one inch water gauge.

As an example, with reference to FIG. 1A, the illustrated embodiment includes twenty fans that each move air at a rate of 220,000 CFM so that each DAC structure 100 is capable of moving about 4.4 million CFM of air, or about 150 tons of air per minute. These are example values only, and larger and smaller fans and/or fan motors may move more or less air. In an example, one metric ton of carbon dioxide occupies forty-five million standard cubic feet of air at 420 ppm carbon dioxide. As an example, with the fan panels 1300 arranged in the illustrated configuration and depending on size, a single DAC structure 100 may advect about 10,000 tons to about 100,000 tons of carbon dioxide from the air annually. In some embodiments, a single DAC structure 100 may advect about 50,000 tons of carbon dioxide from the air annually.

Fan panel 1300 has a height 1300H from the ground, or floor, to the top of the fan panel 1300. Height 1300H may be about 5 m to about 15 m. In some embodiments, height 1300H may be about 10 m. Fan stack 1300 has a width 1300W that is about 3 m to about 8 m, though larger and smaller dimensions are contemplated. In some embodiments, width 1300W may be about 5 m.

Fan panel 1300 includes an upper fan body 1302A and a lower fan body 1302B. Upper fan body 1302A is disposed over, and attached to, lower fan body 1302B. Fan bodies 1302A, 1302B may each have a height 1302H that is about 3 m to about 8 m, though larger and smaller dimensions are contemplated. In some embodiments, height 1302H may be about 5 m. Each fan body 1302A, 1302B includes a body panel 1304, a fan frame 1306, a motor 1308, a motor support 1310, fan blades 1312, and a support structure 1314 including bottom supports 1316, vertical supports 1318, middle supports 1320, and top supports 1322. Body panels 1304 may be located on the side of fan stack 1300 facing the interior of the DAC structure 100. Body panels 1304 may be a solid surface and made of a metal, such as aluminum or stainless steel. Body panels 1304 have an opening for air to pass from the fan stack 1300 and into, and through, the carbon capture cylinders 1112. Body panels 1304 are secured to support structure 1314. Body panels 1304 further includes a horizontal attachment 1324 for securing fan stack 1300 to external support structure 406.

Fan frame 1306 is a cylindrical frame attached to body panel 1304 to allow for movement of air through the fan frame 1306. Frame 1306 has a diameter of 1306D that may be about 2 m to about 6 m, though larger and smaller values are contemplated. In some embodiments, diameter 1306D may be about 4.0 m. Motor support 1310 may be attached to frame 1306 and support fan motor 1308. Motor support 1310 may be made of metal, such as for example, aluminum, steel, or stainless steel. Fan motor 1308 may be supported by motor support 1310 and configured to drive fan blades 1312. Fan motor 1308 may be an electric motor with associated control equipment and variable frequency drives.

Fan blades 1312 may be variable fan blades. Each fan 1302 may include about 3 and 16 fan blades, though more and fewer fan blades are contemplated. In some embodiments, each fan 1302 may include 8 fan blades. The fan blades 1312 may be variable pitch, or angle, allowing each fan 1302 to be tuned for maximum air throughput efficiency. In some implementations, each blade may have an angle of about 4° to about 12°, though larger and smaller values are contemplated. In some embodiments, the fan blades have an angle of about 10°. The fan blades 1312 may run about 300 RPM to about 500 RPM, though larger and smaller RPM values are contemplated. In some embodiments, the fan blades may run at about 359 RPM. The flexibility provided by the variable pitch and speed fans allows different adsorbent porous media to be used in DAC structures 100. For example, for a given fan blade pitch and motor horsepower, there is a certain air outflow, or performance. For a given adsorbent porous media, there is a certain air inflow, or resistance. Each fan may be tuned to the optimum performance for the resistance of the given sorbent material.

Support structure 1314 includes bottom horizontal supports 1316, middle horizontal supports 1320, and top horizontal supports 1322 and vertical supports 1318. The top fan 1302A is supported by top horizontal supports 1322, middle horizontal supports 1320, and vertical supports 1318. The bottom fan 1302B is supported by middle horizontal supports 1320, bottom horizontal supports 1316, and vertical supports 1318. More or less supports are contemplated. Vertical supports 1318, bottom horizontal supports 1316, middle horizontal supports 1320, and top horizontal supports 1322 may be manufactured of aluminum, steel, stainless steel, and/or another metal or composite material.

The Regeneration Station

The Regeneration Station

Figure 15:
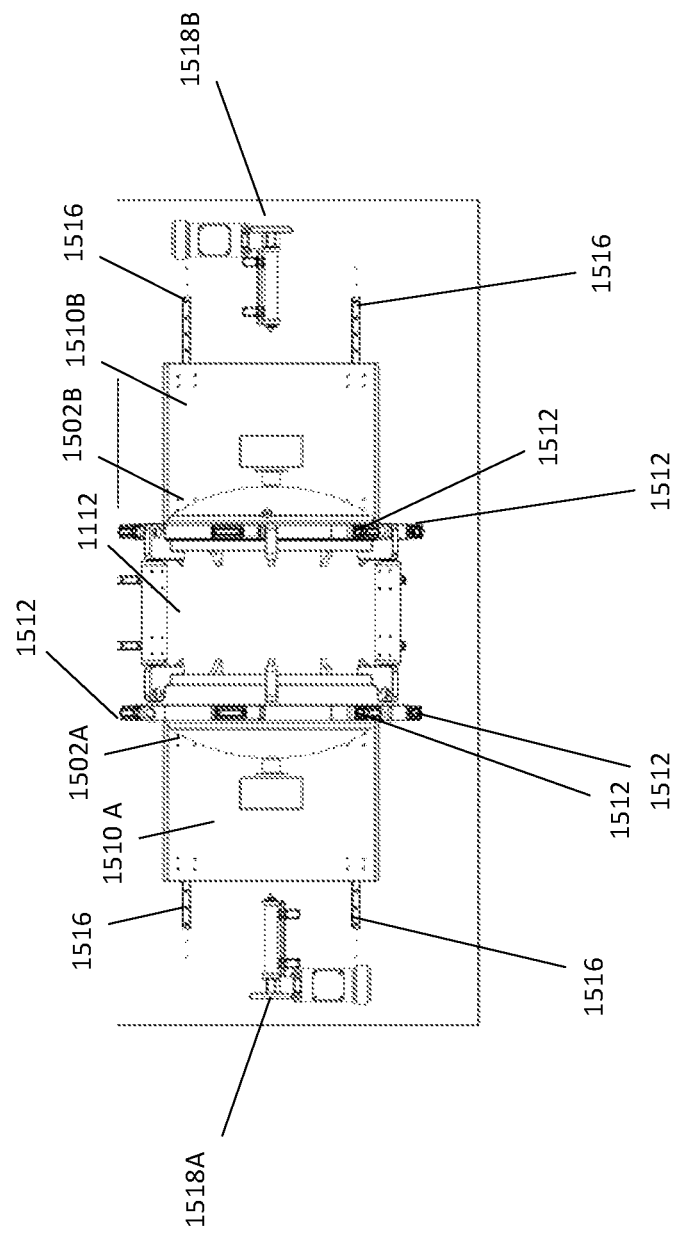
Figure 16:
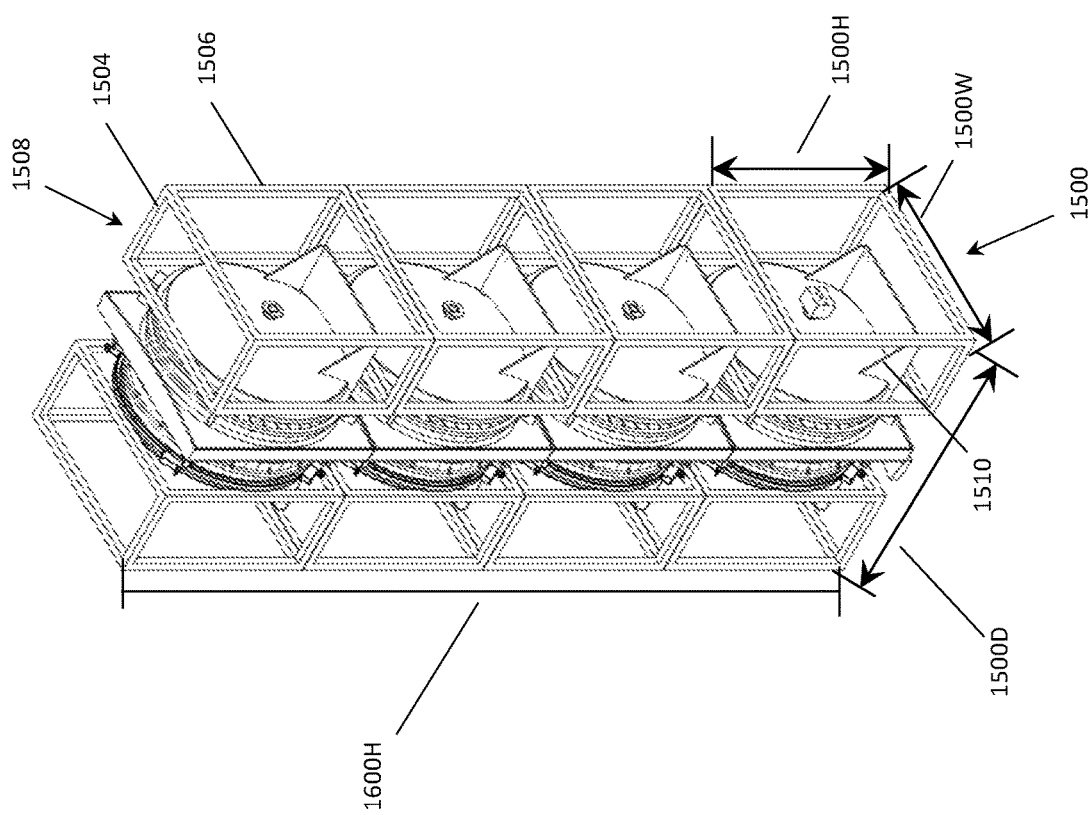
Figure 17:
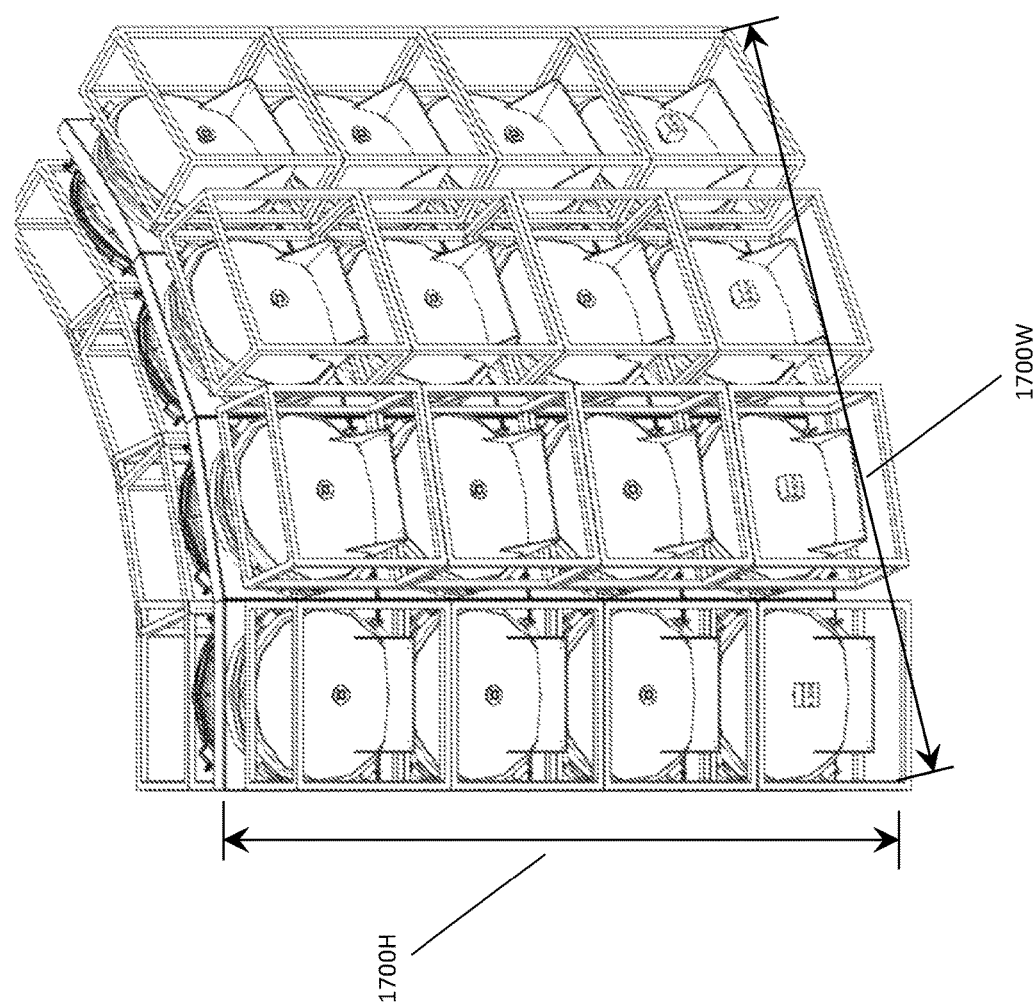

With reference to FIGS. 14A-14C and 15-17, depicted are a single regeneration structure, a stack of regeneration structures, and a regeneration station including a grid of regeneration structures. Multiple regeneration structure 1500 may be stacked to form a regeneration structure stack 1600 (FIG. 16) and multiple regeneration structure stacks 1600 may be placed adjacent to one another to form a regeneration station 1700 (FIG. 17). Regeneration structure 1500 may be an example the regeneration structure 122 described about with respect to FIG. 1A. Regeneration station 1700 may be an example of the regeneration station 120 described above with respect to FIG. 1A. The regeneration station 1700, and more specifically, the regeneration structure 1500 are important for removing the carbon captured by the carbon capture media within the carbon capture cylinders 1112. Without the regeneration station 1700, the carbon capture media within the carbon capture cylinder 1112 would, over time, become saturated and less effective at capturing carbon dioxide from bulk air flow advection. By removing the captured carbon from the carbon capture cylinder 1112, the adsorbent media is refreshed, or regenerated, and able to repeat the carbon capture cycle.

The regeneration structure 1500, also referred to as a carbon removal apparatus, has a height of 1500H, a width of 1500W, a depth of 1500D (though larger and smaller values are contemplated), and includes two chamber doors 1502 (also referred to as doors) disposable and connectable with carbon capture cylinders 1112. The chamber doors 1502 may be shaped to match the carbon capture cylinders 1112 (which are not required to be cylindrical), and in the embodiment shown, are circular in shape and have a diameter of 1 m to 5 m, though larger and smaller doors are contemplated. The height 1500H may be about 1 m to about 5 m, though larger and smaller values are contemplated. In some embodiments, the height 1500H may be about 2.5 m. The width 1500W may be about 1 m to about 5 m, though larger and smaller values are contemplated. In some embodiments, the width 1500W may be about 2.5 m. The depth 1500D may be about 0.5 m to about 5 m, though larger and smaller values are contemplated. In some embodiments, the depth 1500D may be about 1 m. The diameter 1502D may be about 1 m to about 5 m, though larger and smaller values are contemplated. In some embodiments, the diameter 1502D may be about 2.5 m. Generally, the regeneration structure 1500 may be sized to interface with the carbon capture media container 1100, specifically the carbon capture cylinder 1112, described above with respect to FIG. 2.

The regeneration structure 1500 may include horizontal supports 1504 and vertical supports 1506 connected to form a support structure 1508 for each regeneration structure 1500. A bottom portion and a top portion of the support structure 1508 may each be formed by four horizontal supports 1504 connected at right angles, forming a rectangle. The bottom portion and the top portion may be connected at the corners by vertical supports 1506. The support structure 1508 may be made from a metal, such as aluminum, steel, or stainless steel or other supporting material, for example. The horizontal supports 1504 and the vertical supports 1506 may be connected by welding, riveting, bolting, and/or other fastening method, for example.

The support structure 1508 for the regeneration structure 1500 may facilitate the stacking of multiple regeneration structures 1500, such as illustrated in FIGS. 16 and 17. Additionally, the support structure 1508 may facilitate the movement (e.g., opening and closing) of the chamber door 1502. A support base 1510 may be fastened to the chamber door 1502 to provide support for the weight of the door 1502 as well as provide for opening and closing of the door 1502 as will be discussed further below.

The chamber door 1502 further includes one or more locks, described as lock mechanisms 1512 around the outer perimeter of the door 1502. The one or more lock mechanisms 1512 are suited for interfacing with the clamp points 1118 of the carbon capture cylinders 1112. In the illustrated embodiment, the lock mechanism 1512 is linearly translated through an opening in the clamp point 1118 to effectively lock the chamber door 1502 to the carbon capture cylinder 1112. In some embodiments, the lock mechanism 1512 may rotationally translate in a manner that locks the chamber door 1502 to the carbon capture cylinder 1112. In some other embodiments, the lock mechanisms 1512 may be screw type mechanisms that provide resistance to movement in multiple directions. Other types of lock mechanisms are contemplated for use with the regeneration structure 1500.

A seal mechanism is used at an interface 1514 of the chamber door 1502 and the media cylinder 1112. The seal mechanism provides an airtight seal between the door 1502 and the cylinder 1112 at the interface 1514. Creating an airtight seal allows the regeneration station to perform the process of releasing the carbon from the adsorbent media in the cylinder 1112. Multiple different techniques may be used for releasing the carbon from the adsorbent media including, for example, pulling a vacuum, flushing with a liquid, heating, and/or pressurizing with cold water or a solvent. Generally, providing an airtight seal provides the flexibility to utilize multiple different methods of releasing the trapped carbon from the adsorbent porous media.

The seal mechanism may be any suitable mechanism for providing an airtight seal. In some embodiments, an inflatable toroid or other inflatable apparatus, formed for example, of an inflatable elastomer, may be placed along an inside rim of the door 1502. The apparatus would then be inflated after engaging the lock mechanisms 1512 to thereby create an airtight seal. The combination of the compression from the door 1502 placed against the cylinder 1112 and the inflatable apparatus may provide the necessary sealing. In some embodiments, a gasket may be inserted into an inside rim of the door 1502 to form the seal at the interface 1514. The gasket may be sized such that it is compressed when the door 1502 contacts the cylinder 1112 so that the gasket is compressed to fill the space in the interface 1514 and thereby create an airtight seal.

Each regeneration structure 1500 include two doors 1502, an interior door 1502A and an exterior door 1502B. When a cell containing a carbon capture cylinder 1112 is moved into position within the regeneration structure (e.g., between the doors 1502A and 1502B), the doors 1502A and 1502B are moved to interface with the cylinder 1112. The doors 1502A, 1502B may be translated linearly toward and away from the cylinder 1112. In some embodiments, the doors 1502A, 1502B may rotationally translate toward and way from the cylinder 1112. In some embodiments, the doors 1502A, 1502B may be translated in a combination of linear and rotational movement. Each door 1502A, 1502B is locked into place using lock mechanisms 1512, thereby engaging the seal mechanism to create an airtight seal between the doors 1502A, 1502B and the cylinder 1112 and turning cylinder 1112 into a pressure vessel. When in this position, the regeneration structure may perform the regeneration process. Each regeneration structure may be connected to a vacuum pump or other pump to depressurize and pressurize the pressure vessel. Each regeneration structure may be connected to rigid pipes or flexible hoses that deliver water, solvents, or steam to the pressure vessel or the other pump. Each regeneration structure may be connected to rigid pipes or flexible hoses that extract water, solvents, steam, and carbon dioxide from the pressure vessel or the vacuum pump.

With reference to FIG. 15, an exemplary mechanism is illustrated for closing the regeneration structure 1500 with and sealing a carbon capture cylinder 1112 for processing. In the depicted embodiment, regeneration structure 1500 includes an interior base 1510A and door 1502A and an exterior base 1510B and door 1502B. Each regeneration base 1510A, 1510B and door 1502A, 1502B moves along respective tracks 1516 and are moved by motors 1518A and 1518B. Motors 1518A, 1518B translate, or convey, each half of the regeneration structure 1500 linearly toward and away from carbon capture cylinder 1112. This separation of each half of regeneration structure 1500 allows the hoop structure 108 to rotate thereby removing a processed cylinder 1112 away from the regeneration structure 1500 and bringing another cylinder 1112 to be processed by the regeneration structure 1500.

Multiple regeneration structures 1500 may be stacked vertically to form a regeneration structure stack 1600 (also referred to as a stack). The stack 1600 may have a height 1600H that may be about the height of the total number of regeneration structures included in the stack. That is, if there are two regeneration structures 1500 in the stack 1600, then the height 1600H is twice the height 1500H. The height 1600H may be about 4 m to about 20 m, though larger and smaller values are contemplated. In some embodiments, the height 1600H may be about 10 m. The support structure 1508 of each regeneration structure 1500 may be used to form the stack 1600. The stack 1600 contains the same number of regeneration structures 1500 as the number of frames 208 in the stack 300 as discussed above with respect to FIGS. 2 and 3.

Multiple stacks 1600 may be connected adjacent to one another to form the regeneration station 1700. The regeneration station 1700 has a height 1700H that is equal to the height 1600H of the stacks included in the regeneration station. The regeneration station 1700 has a width 1700W that is about equal to a multiple of the width of the stacks 1600, or regeneration structure 1500. The width 1700W may be larger or smaller depending on whether the stacks 1600 are arranged in an arcing manner, such as the depicted in FIG. 17. In the illustrated embodiment, the regeneration station 1700 includes a four-by-four grid of sixteen regeneration structures 1500. In this configuration, the regeneration station 1700 may regenerate sixteen carbon capture media containers 1100, including cylinders 1112, at a time which represents one-sixth of the total number of cylinders 1112 in the DAC structure 100. The size of the regeneration station 1700 and quantity of the carbon capture media containers 1100 that may be regenerated at a time may be larger or smaller. In the illustrated embodiment, this configuration allows five-sixths (e.g., eighty) of the cylinders 1112 to be actively advecting carbon dioxide from the air while one-sixth (e.g., sixteen) of the cylinders 1112 are being regenerated by the regeneration station 1700.

As previously mentioned, regeneration of the sorbent material may be accomplished using a variety of different processes. The design of the regeneration structure 1500 provides flexibility for using one or more different processes concurrently or consecutively to provide the best results in regenerating the adsorbent media.

Figure 18A:
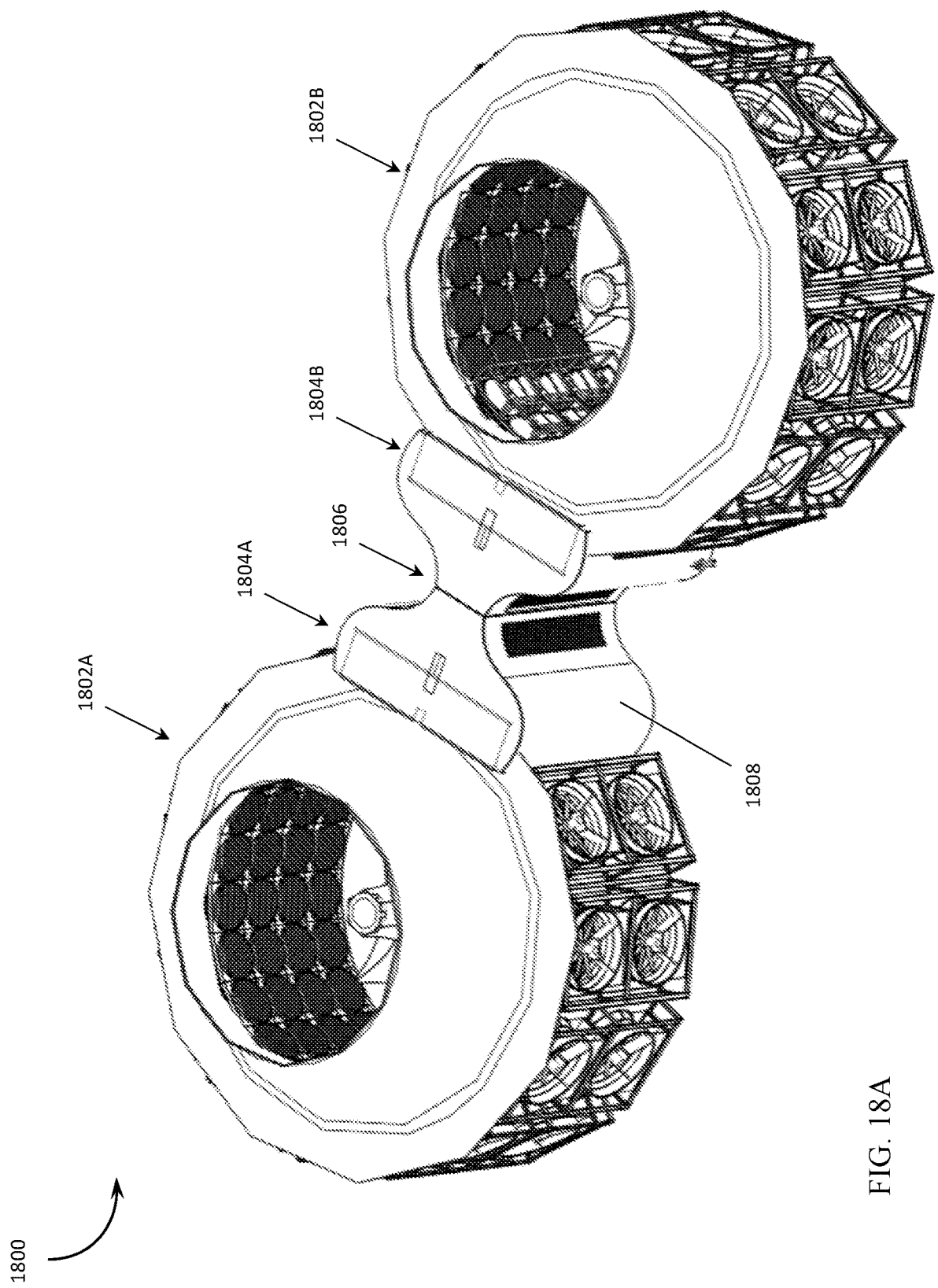
FIGS. 18A-18B are perspective illustrations of exemplary configurations for operating two atmospheric carbon dioxide removal structures, according to some embodiments of the present disclosure.

With reference to FIG. 18A, depicted is an exemplary dual direct air capture (DAC) structure configuration where two DAC structures share a regeneration region according to some embodiments of the present disclosure. The dual structure configuration 1800 includes a first DAC structure 1802A including a first regeneration station 1804A and a second DAC structure 1802B including a second regeneration station 1804B. The first and second DAC structures 1804A, 1804B may be examples of the DAC structure 100 described above with respect to FIGS. 1A-1D. The first and second regeneration stations 1804A, 1804B may be examples of the regeneration station 1700 described above with respect to FIG. 17. The first and second regeneration stations 1804A, 1804B of the first and second DAC structures 1802A, 1802B are connected at the regeneration region 1806 and enclosed by a shroud 1808 (also referred to as a plenum).

The shroud 1808 may include the infrastructure necessary to process the adsorbent porous media and desorb carbon dioxide from it. Necessary infrastructure may include vacuum pumps, other pumps, water and steam supply pipes, extraction pipes (also referred to as atmospheric vent pipes, drainpipes, condensation pipes), holding tanks, and process control equipment. Infrastructure located within the shroud 1808 may be connected to a centralized balance of plant (i.e., a facility that serves more than one DAC Structure configuration 100 or dual DAC Structure configuration 1820 from which cold water, hot water, steam, and electricity can be supplied to the infrastructure located within the shroud 1808 and carbon dioxide laden steam and water can be transferred away from the shroud 1808 region for separation, treating, and compression). Placing the regeneration regions adjacent to one another and sharing the regeneration region reduces the infrastructure footprint and costs by sharing the necessary infrastructure. Additionally, there may be an energy savings achieved by co-locating regeneration station 1804A and 1804B in regeneration region 1806. For example, the regeneration stations 1804A, 1804B may be configured to operate on an alternating cycle. That is, regeneration station 1804A may be beginning the process as regeneration station 1804B is finishing the process. In this configuration, steam or heated water used by regeneration station 1804B may be pumped to regeneration stations 1804A to improve thermal efficiency of the regeneration process. The same is true for any chilled water that could be used by regeneration station 1804A, 1804B.

Figure 18B:
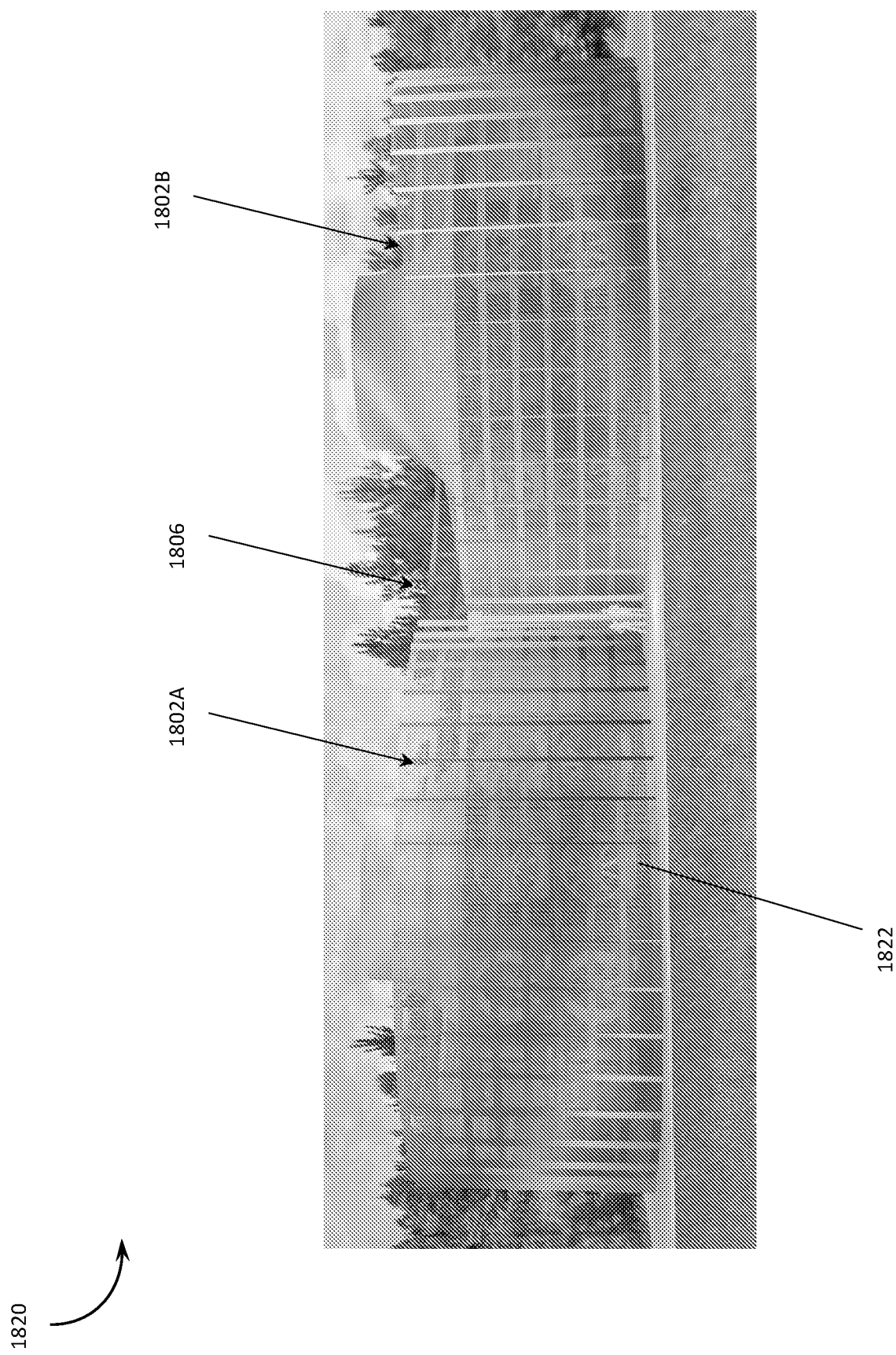

With reference to FIG. 18B, depicted is another exemplary dual direct air capture (DAC) structure configuration where two DAC structures share a regeneration region according to some embodiments of the present disclosure. The dual structure configuration 1820 includes a first DAC structure 1802A including a first regeneration station 1804A and a second DAC structure 1802B including a second regeneration station 1804B. The first and second regeneration stations 1804A, 1804B of the first and second DAC structures 1802A, 1802B are connected at the regeneration region 1806 and enclosed by a shroud 1808 as described above with respect to FIG. 18A.

The dual structure configuration 1820 further includes an infinity shield 1822 that surrounds the perimeter of the dual structure configuration 1820. The infinity shield 1822 may be constructed of a fencing, screen, or flexible netting material that provides a level of protection for the exposed fans and fan blades on the exterior of each DAC structure 100. The infinity shield 1822 may prevent debris from being pulled in by the fan panels. Additionally, the infinity shield 1822 may prevent birds and bats from being pulled into the fan panels. The infinity shield 1822 may be about 2 m to about 4 m away from the fan panels, though larger and smaller values are contemplated. The vertical posts that support the infinity shield may be constructed using perforated hollow tubing constructed out of any suitable material. When connected to any centralized balance of plant thermal exhaust distribution system, the vertical posts can also serve to increase the concentration of carbon dioxide advected into each DAC structure 100 which may improve advection efficiency.

Figure 19A:
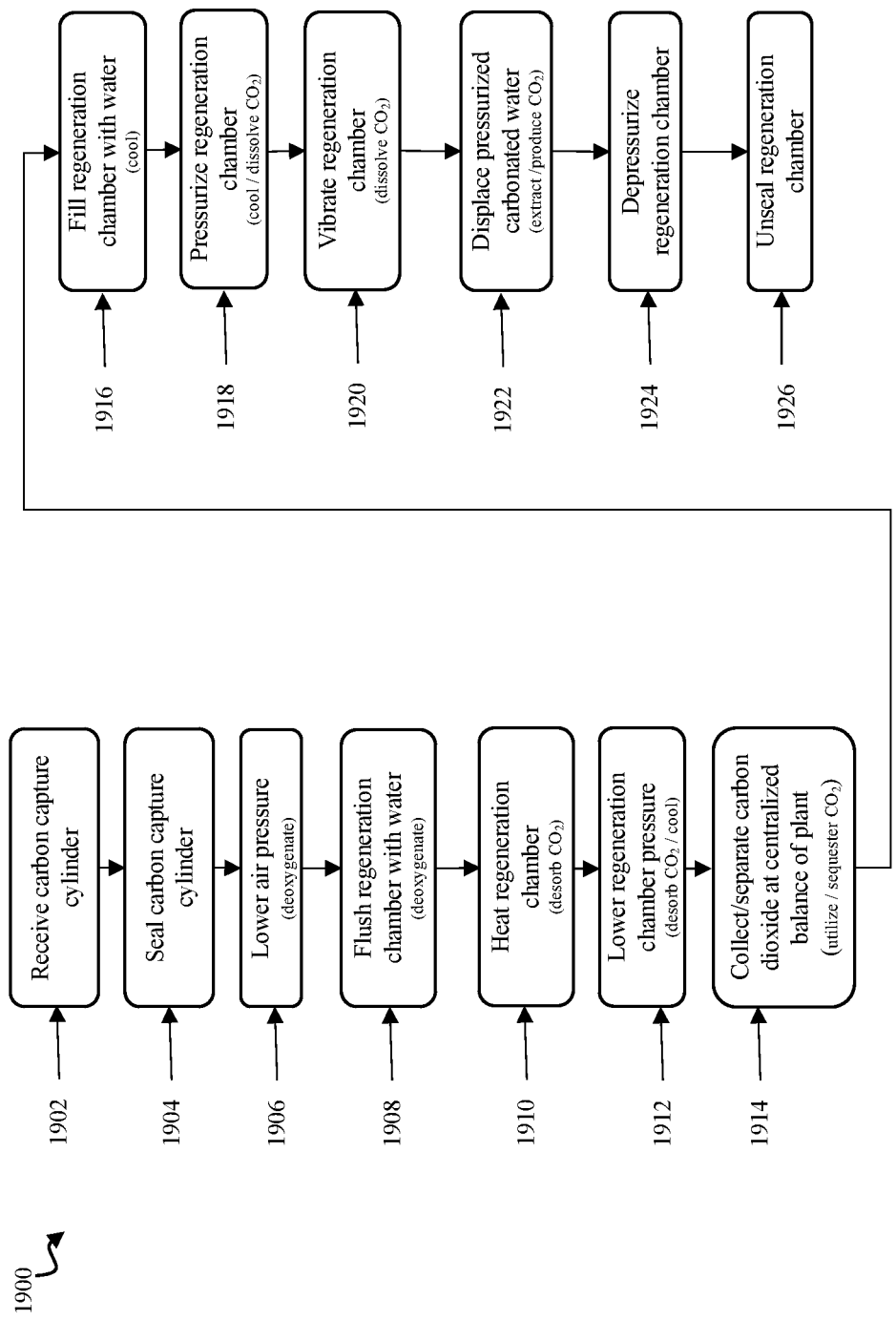
FIGS. 19A-19B are flow diagrams of exemplary methods for regenerating the sorbent media within the atmospheric carbon dioxide removal structure, according to some embodiments of the present disclosure.
Figure 19B:
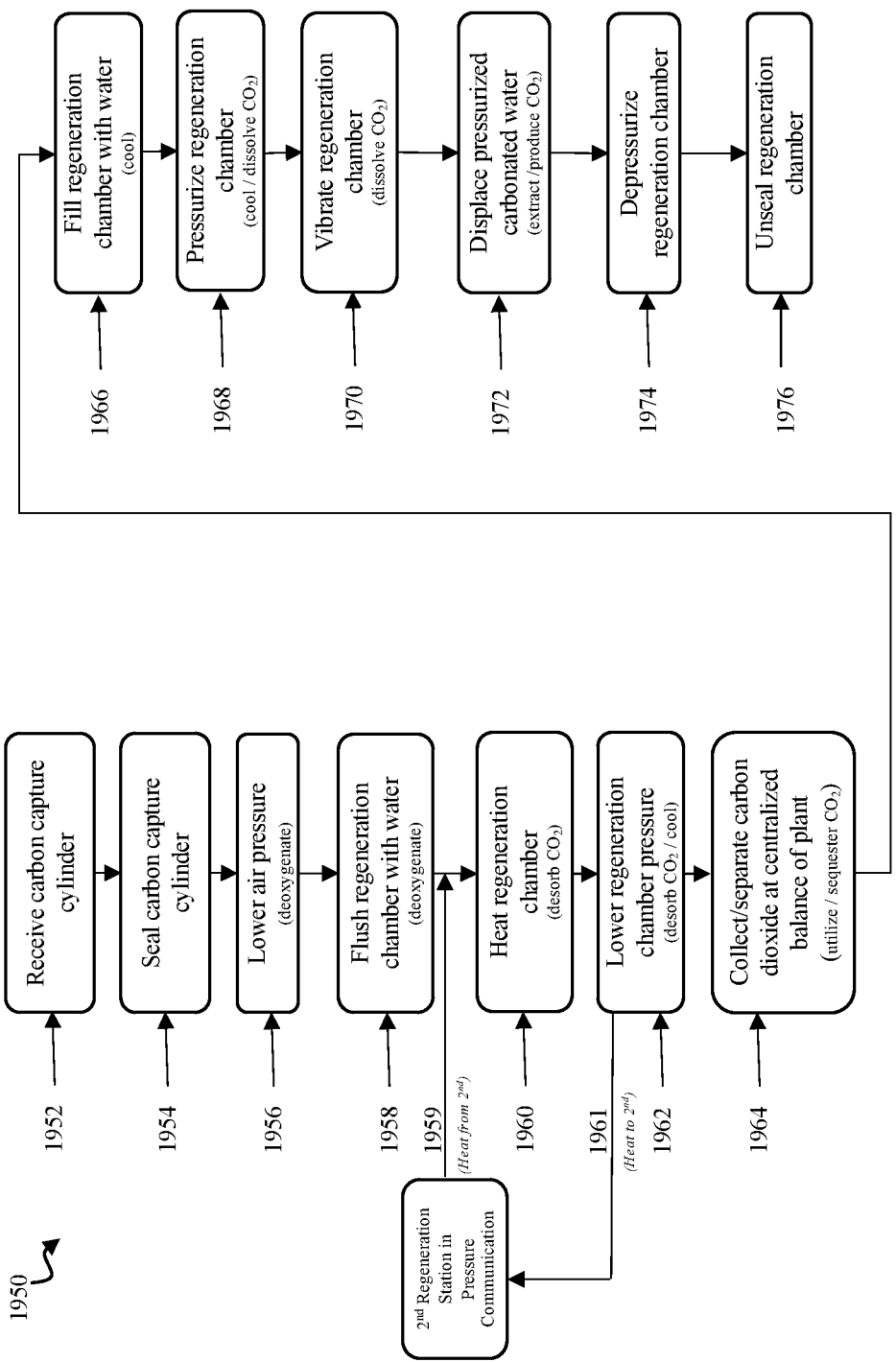

FIGS. 19A and 19B depict exemplary methods of regenerating the adsorbent porous media. With reference to FIG. 19A, a flow diagram for releasing, or desorbing, carbon dioxide from the sorbent material according to some embodiments of the present disclosure is illustrated. In an embodiment, method 1900 may be implemented by a regeneration station, such as regeneration station 1700, and more specifically by each regeneration structure in the regeneration station, such as regeneration structure 1500. It is understood that additional steps can be provided before, and after the steps of method 1900, and that some of the steps described can be replaced or eliminated for other embodiments of the method 1900. According to some embodiments of the present disclosure, the total amount of time needed to perform the method 1900 may be about 5 minutes to about 45 minutes, though shorter and longer times are contemplated. In some embodiments, the method 1900 may be completed in about 15 minutes.

At block 1902, the regeneration structure receives a carbon capture cylinder for processing. The carbon capture cylinder may have been in a carbon capture state, adsorbing carbon dioxide from the air. The media cylinder may be moved into position between the doors of the regeneration structure by the hoop structure as described above. In some embodiments, the carbon capture cylinder may be translated laterally into position between the doors of the regeneration structure.

At block 1904, the regeneration structure seals the carbon capture cylinder for desorption, also referred to as regeneration. The regeneration structure may close the doors on either side of the carbon capture cylinder and engages the door locks, thereby sealing the media cylinder. In some embodiments, an inflatable seal is then engaged to form an airtight seal between the doors of the regeneration structure and the cylinder. In some alternative embodiments, the doors include a gasket that expands to form an airtight seal when the pressure of the doors compresses the gasket. At this point the regeneration structure and the cylinder combined may be referred to as a regeneration chamber. The term regeneration chamber will be used for the remainder of the discussion below. In its sealed state, the regeneration chamber is now in the carbon removal state, where carbon dioxide can be removed from the carbon capture cylinder.

At block 1906, the regeneration structure lowers the air pressure in the regeneration chamber, creating a vacuum. Pulling a vacuum in the regeneration chamber helps to create an anaerobic environment inside the regeneration chamber and may improve the useful life of the sorbent material across multiple adsorption/desorption cycles. The air in the regeneration chamber may be vented by the vacuum pump into the atmosphere. The air pressure within the regeneration chamber may be about 0 bar to about 0.5 bar, though larger and smaller values are contemplated. In some embodiments, the air pressure may be about 0.2 bar.

At block 1908, the regeneration structure flushes the regeneration chamber with water to further help create an anaerobic environment. The water may purge any residual air within the sorbent media by displacing any residual air in the regeneration chamber with the water. The water may be heated to aid in pre-heating the regeneration chamber. The water may be heated about 30° C. to about 70° C., though larger and smaller values are contemplated. In some embodiments, the water may be heated to about 40° C. In some embodiments, the regeneration chamber may first be filled by suction, as the regeneration chamber pressure equilibrates to the water supply line pressure of around 1 bar. Subsequent pumping of water may be needed to displace any residual air from the regeneration chamber, which may be vented to atmosphere.

At block 1910, the regeneration structure heats the regeneration chamber. The regeneration structure may use steam to further heat the regeneration chamber. Steam is introduced at one end of the regeneration chamber and extracted at the opposite end of the regeneration chamber along with carbon dioxide. The heat and steam desorb carbon dioxide from the sorbent material. Steam and carbon dioxide are extracted from the regeneration chamber and transported by pipes to the centralized balance of plant for processing.

At block 1912, the regeneration structure lowers the air pressure in the regeneration chamber by creating a vacuum to further desorb carbon dioxide from the sorbent material. The pressure within the regeneration chamber during method 1912 may be about 0 bar to about 0.5 bar, though larger and smaller values are contemplated. In some embodiments, the pressure may be about 0.2 bar. Steam and carbon dioxide are extracted from the regeneration chamber by the vacuum pump and transported by pipes to the centralized balance of plant. Creating a vacuum within the regeneration chamber results in an isenthalpic expansion of the steam which may serve to cool the regeneration chamber and the adsorbent porous media.

At block 1914, the centralized balance of plant separates the carbon dioxide from the steam. As the carbon dioxide laden steam leaves the regeneration chamber, either directly or via the vacuum pump, the centralized balance of plant condenses the steam to liquid water and extracts the desorbed carbon dioxide. In some examples, the extracted carbon dioxide is pure carbon dioxide. The centralized balance of plant may use cooling pipes to condense the steam. The centralized balance of plant may include a condenser, collection pipes, pumps, liquid traps, and glycol dehydration units for treating and compressing the carbon dioxide for transport via pipeline for subsequent utilization or geologic sequestration.

At block 1916, the regeneration structure fills the regeneration chamber with water or possibly another solvent. The term water when used in the remainder of the discussion that references FIG. 19A means water or solvent or any alternating sequential use thereof. The water may be cooled to a temperature of about 0° C. to about 10° C., though larger and smaller values are contemplated. In some embodiments the water may be cooled to about 5° C. Flushing the still warm regeneration chamber with water may produce steam as the cold water contacts the warm sorbent martial. The steam may desorb and further evacuate residual carbon dioxide from the sorbent media. The steam and desorbed carbon dioxide may be extracted from the regeneration chamber in a manner as discussed above with respect to method 1914. The regeneration structure may continue filling the regeneration chamber with cold water until the regeneration chamber is filled.

At block 1918, the regeneration structure pressurizes the regeneration chamber. The regeneration chamber may be pressurized to a pressure of about 8 bar to about 12 bar, though larger and smaller values are contemplated. In some embodiments, the regeneration chamber may be pressurized to about 10 bar.

At block 1920, the regeneration structure vibrates the regeneration chamber. The vibration may induce solubility of residual carbon dioxide into the water. In various embodiments, the regeneration structure may vibrate the regeneration chamber continuously. Depending upon the settings, the regeneration structure may vibrate the regeneration chamber either continuously or for specific intervals over a period of time about 1 minute to about 5 minutes, though larger and smaller values are contemplated. In some embodiments, the regeneration station may vibrate the regeneration chamber over a 3 minute time period. In some embodiments, the regeneration structure may vibrate the regeneration chamber in pulses for a period of time about 5 seconds to about 30 seconds every minute. In some embodiments, the regeneration structure may pulse vibrate the regeneration chamber for 5 seconds four times a minute.

At block 1922, additional pressurized water may be used to displace the carbonated water out of the regeneration chamber for processing at the centralized balance of plant. The water used to flush the regeneration chamber may be chilled to a temperature about 0° C. to about 10° C., though larger and smaller values are contemplated. In some embodiments, the water may be cooled to about 5° C.

At block 1924, after approximately one pore volume of water (i.e., defined as the volume of the regeneration chamber less the bulk volume of the adsorbent porous media bulk plus the adsorbent porous media pore volume), more or less, is injected into regeneration chamber and one pore volume, more or less, of carbonated water is removed from the regeneration chamber, the water supply line to regeneration chamber may be closed and the regeneration chamber may be allowed to depressurize into the centralized balance of plant. Adsorption of carbon dioxide may be enhanced by flowing chilled water and lowering the temperature of the sorbent material when it is subsequently returned to carbon capture mode. Sorbent material resiliency may also be enhanced by flowing chilled water and lowering the temperature of the sorbent material before exposing the sorbent material to oxygen in the air.

At block 1926, the regeneration structure unseals the regeneration chamber. The lock mechanisms are released and the doors are removed from the media cylinder. In so doing, the regeneration chamber is converted back to a carbon capture cylinder. The now cooled carbon capture cylinder is ready to capture more carbon dioxide. The carbon capture cylinder may then be moved, making room for another carbon capture cylinder to be received by the regeneration structure. When introduced back to air flow, the regenerated and wet carbon capture cylinder may further enhance the adsorption of carbon dioxide as a result of evaporative cooling of air flow through the sorbent media and residual water that is trapped in the sorbent material.

With reference to FIG. 19B, a flow diagram for releasing, or desorbing, carbon dioxide from the sorbent material according to some embodiments of the present disclosure is illustrated. In an embodiment, method 1950 may be implemented by a first regeneration station that shares a regeneration region with a second regeneration station as described above. It is understood that additional steps can be provided before, and after the steps of method 1950, and that some of the steps described can be replaced or eliminated for other embodiments of the method 1950. According to some embodiments of the present disclosure, the total amount of time needed to perform the method 1950 may be about 10 minutes to about 50 minutes, though larger and smaller values are contemplated. In some embodiments, the method 1950 may be completed in about 20 minutes. The regeneration cycles of the first and second regeneration stations may be offset in time to take advantage of the shared regeneration region.

At block 1952, the regeneration structure receives a carbon capture cylinder, similar to block 1902.

At block 1954, the regeneration structure seals the carbon capture cylinder for desorption, similar to block 1904.

At block 1956, the regeneration structure lowers the air pressure in the regeneration chamber, creating a vacuum, similar to block 1906.

At block 1958, the regeneration structure flushes the regeneration chamber with water to further help create an anaerobic environment, similar to block 1908.

At block 1959, the regeneration chamber is placed in pressure communication with a regeneration chamber at a second regeneration station that has completed method 1960 and a vacuum is pulled on the first regeneration chamber to transfer heat from the second regeneration chamber to preheat the regeneration chamber at the first regeneration station. The regeneration chamber is isolated and removed from pressure communication with the regeneration chamber at a second regeneration station.

At block 1960, the regeneration structure heats the regeneration chamber, similar to block 1910.

At block 1961, the regeneration chamber is placed in pressure communication with a regeneration chamber at a second regeneration station that has completed method 1958.

At block 1962, the regeneration structure at the second regeneration station lowers the air pressure in a regeneration chamber at the second regeneration station to indirectly create a vacuum in the regeneration chamber at the first regeneration station and transfer heat away from it and to a regeneration chamber at the second regeneration station, to further desorb carbon dioxide from the sorbent material in the regeneration chamber at the first regeneration station, similar to block 1912. The regeneration chamber is isolated and removed from pressure communication with the regeneration chamber at a second regeneration station.

At block 1964, the centralized balance of plant separates the carbon dioxide from the steam, similar to block 1914.

At block 1966, the regeneration structure fills the regeneration chamber with water or possibly another solvent, similar to block 1916. The term water when used in the remainder of the discussion that references FIG. 19B means water or solvent or any alternating sequential use thereof.

At block 1968, the regeneration structure pressurizes the regeneration chamber, similar to block 1918.

At block 1970, the regeneration structure vibrates the regeneration chamber, similar to block 1920.

At block 1972, additional pressurized water may be used to displace the carbonated water out of the regeneration chamber for processing at the centralized balance of plant, similar to block 1922.

At block 1974, after approximately one pore volume of water (i.e., defined as the volume of the regeneration chamber less the bulk volume of the adsorbent porous media bulk plus the adsorbent porous media pore volume), more or less, is injected into regeneration chamber and one pore volume, more or less, of carbonated water is removed from the regeneration chamber, the water supply line to regeneration chamber would be closed and the regeneration chamber would be allowed to depressurize into the centralized balance of plant, similar to block 1924.

At block 1976, the regeneration structure unseals the regeneration chamber, similar to block 1926.

Carbon Dioxide Sensors

Figure 20A:
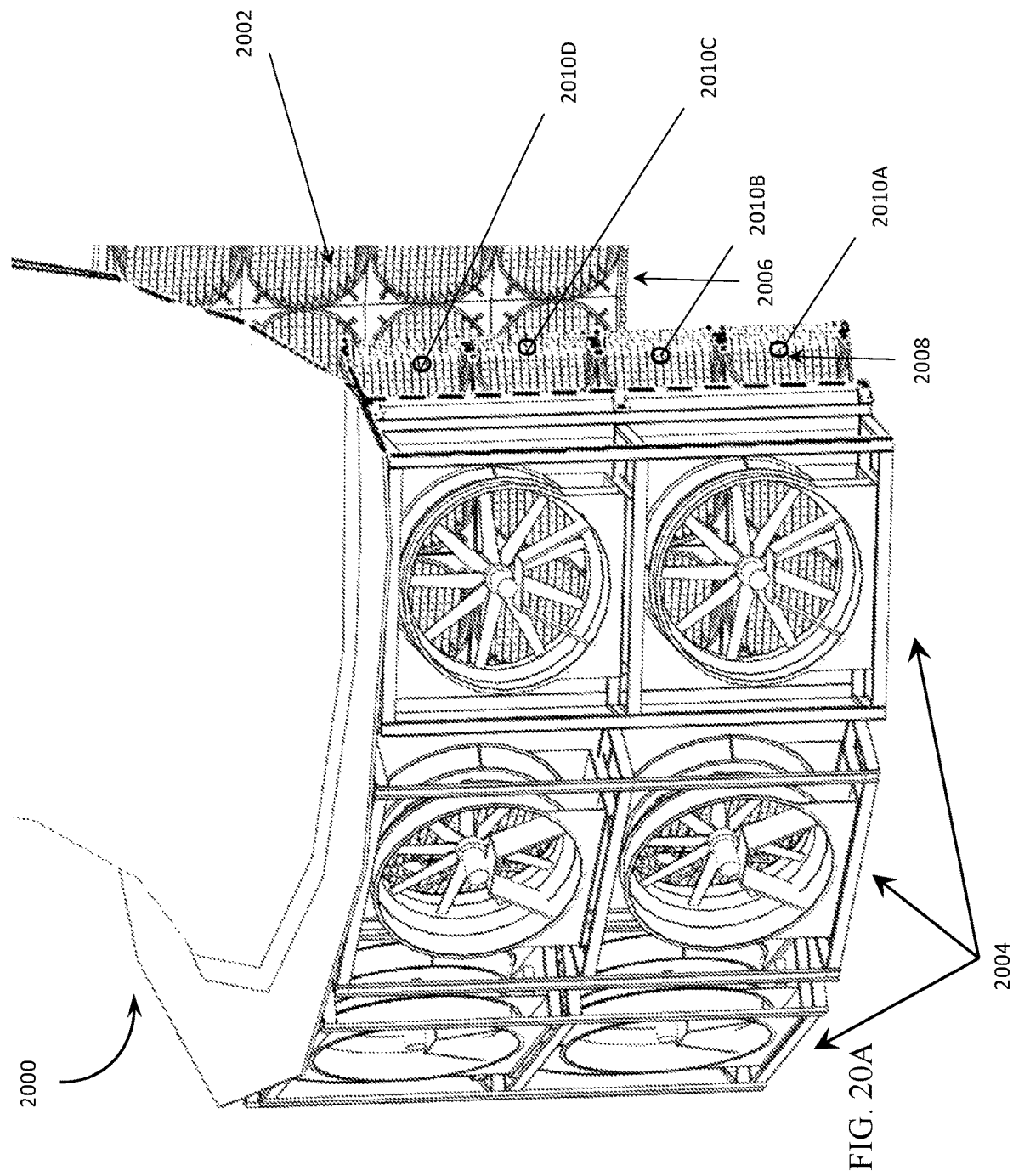
FIGS. 20A-20B are perspective illustrations of exemplary carbon dioxide sensor locations within an atmospheric carbon dioxide removal structure, according to some embodiments of the present disclosure.
Figure 20B:
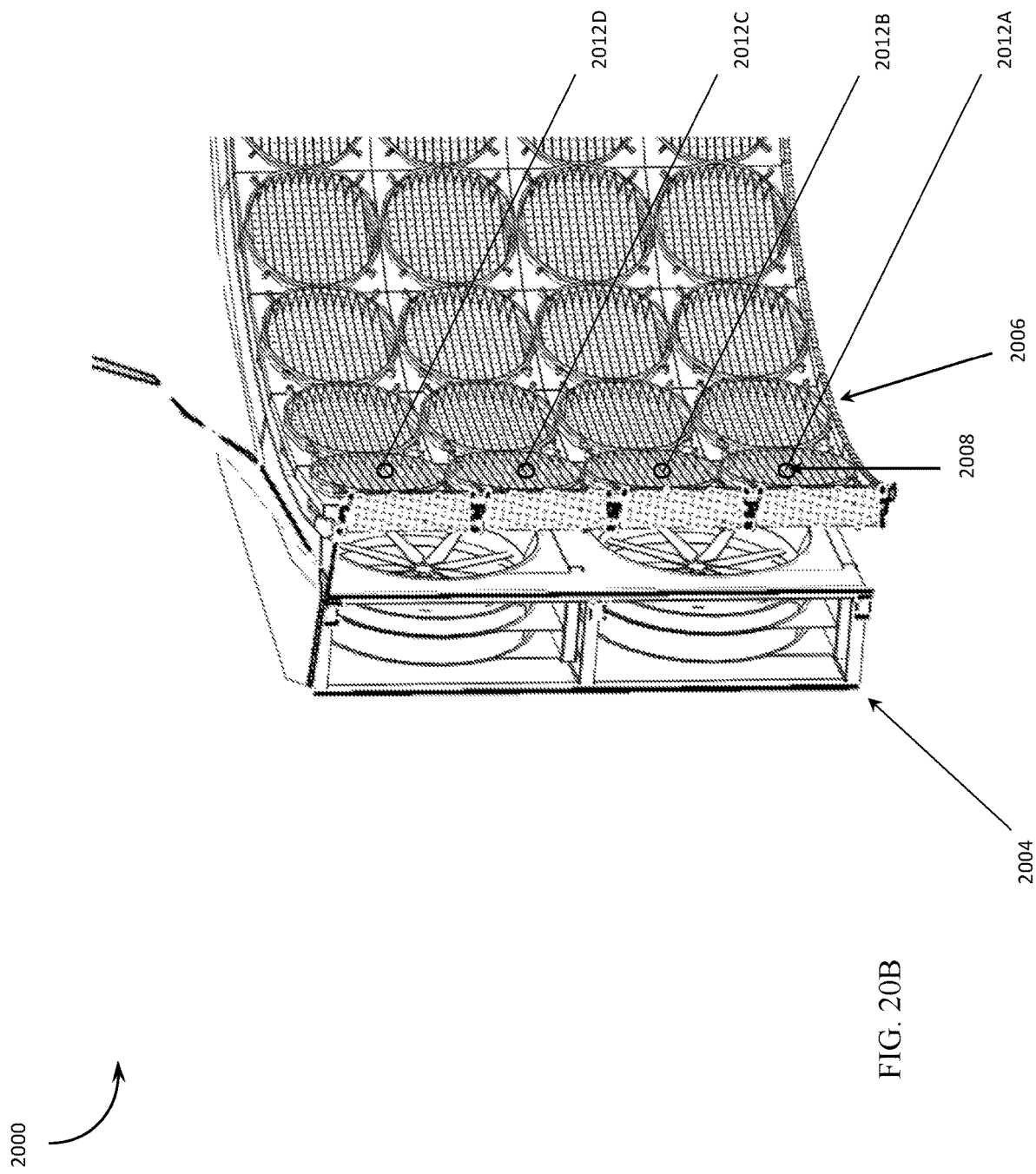

With reference to FIGS. 20A-20B, depicted are cross sections of an exemplary DAC structure with locations for upstream and downstream carbon dioxide sensors for calculating total carbon dioxide adsorbed by the adsorbent material. The method relies on mass conservation principles and data on the amount of carbon dioxide concentration levels upstream and downstream of a sorbent holding apparatus 2006. FIG. 20A depicts an exterior view of a DAC structure, such as DAC structure 100, and the location of upstream carbon dioxide sensors. DAC structure 2000 includes carbon capture vessels 2002, fan stacks 2004 and sorbent holding apparatuses 2006. FIG. 20B depicts a side view of the DAC structure including locations of downstream carbon dioxide sensors. Sensors 2008 are placed at multiple points around DAC structure 2000 including exterior to the exterior facing and interior facing sides of the sorbent holding apparatuses 2006.

One or more sensors 2008 are positioned at upstream sensor positions 2010A-2010D, as illustrated in FIG. 20A. Sensors 2008 may detect an amount of carbon dioxide advected by bulk air flow prior to the air entering the sorbent holding apparatus 2006. The detected amount of carbon dioxide may be stored and compared to the detected amount of carbon dioxide detected at downstream locations.

One or more sensors 2008 are positioned at downstream sensor positions 2012A-2012D. Sensors 2008 positioned at downstream sensor location 2012A-2012D may detect an amount of carbon dioxide advected by bulk air flow as the air exits the sorbent holding apparatus 2006. The amount of carbon dioxide in the air downstream of the sorbent holding apparatus 2006 should be less than the amount of carbon dioxide in the air upstream of the sorbent holding apparatus 2006.

A difference in the amount of carbon dioxide measured across a carbon capture vessel 2002 may be used to infer, or calculate, the amount of carbon dioxide adsorbed by the sorbent materials in a carbon capture vessel 2002 on a real time basis across from each carbon capture vessel 2002.

Powering the DAC Structure

A contractual or behind the meter green power supply is preferred to reduce the carbon footprint of the electrical load of the DAC structure. Process waste heat from an industrial source is also preferred to reduce the carbon footprint of the thermal load used to regenerate the sorbent material.

Alternatively, or in addition, a behind-the-meter, on-site, natural gas fired power plant with a thermal heat recovery unit is preferred for generating the electricity used by the DAC structure and suppling a portion of the thermal load used by the regeneration process. On-site, natural gas fired boilers may be used to supplement and supply any unmet thermal load. Alternatively, or in addition, a grid power supply may be used to power the direct air capture (DAC) structure together with on-site natural gas fired boilers to satisfy thermal load. Regardless, net carbon capture from the DAC structured would be reduced by the direct and indirect carbon emissions from these power and thermal energy supply options.

As discussed above, exhaust from any on-site combustion of natural gas may be collected and distributed through the infinity shield 1822 to increase the carbon dioxide concentration of the air upstream of the fans, improving process economics. Co-locating DAC structures and other opportunities to recover and use thermal heat, such as waste heat from carbon dioxide compression, may also maximize the thermal efficiency of the chosen power and thermal supply option.

Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

The present disclosure is directed to an atmospheric carbon dioxide removal system that includes a plurality of carbon capture containers forming an enclosed space. Each carbon capture container has an outwardly facing side and an inwardly facing side with the inwardly facing side facing the enclosed space. The atmospheric carbon dioxide removal system further includes a plurality of fans disposed adjacent the plurality of carbon capture containers with the plurality of fans being arranged to move air through the plurality of carbon capture containers in a first direction from the outwardly facing side into the enclosed space. The plurality of carbon capture containers contains a plurality of sorbent material sub containers configured to receive air flowing in the first direction, to redirect the air through the sorbent material in a second direction orthogonal to the first direction, and to return the air flowing to the first direction from the outwardly facing side into the enclosed space. An air diverter is disposed within the enclosed space that is structurally configured to receive the air flowing in the first direction and redirect the air to flow in a second direction that is angled upwardly from the first direction. A velocity stack is disposed on top of the enclosed space and configured to accelerate the flow of the air in the second direction.

In some embodiments, the atmospheric carbon dioxide removal system may further include a plurality of regeneration structures disposed adjacent the plurality of carbon capture containers. The carbon capture containers may be configured to remove carbon dioxide from the air. The regeneration structures may be configured to remove the carbon dioxide from the carbon capture containers. In some embodiments, the plurality of carbon capture containers includes carbon capture containers disposed on top of other carbon capture containers to form a stack of carbon capture containers. The stack of carbon capture containers has a first height, the velocity stack has a second height, and the second height is greater than the first height. In some embodiments, the plurality of carbon capture containers contains a sorbent material designed to remove carbon dioxide from the air.

In some embodiments, the velocity stack has a bottom opening with a first diameter and a top opening with a second diameter that is smaller than the first diameter. In some embodiments, the air diverter has a base with a first cross-sectional width and a top with a second cross-sectional width than is smaller than the first cross-sectional width.

The present disclosure is further directed to an atmospheric carbon dioxide removal system that includes a first support structure arranged, disposed, and configured to support a plurality of fans, a second support structure and a hoop structure arranged to hold a plurality of carbon capture containers that is disposed between the first support structure and the second support structure. The hoop structure may rotate relative to the first support structure driven by one or more motors that are disposed at a base of the hoop structure such that the one or more motors convey the hoop structure relative to the first support structure.

In some embodiments, a plurality of rollers may be disposed on the first support structure and second support structure to guide the hoop structure as it rotates relative to the first support structure. In some embodiments, a plurality of rollers may be disposed on a bottom surface of the hoop structure and contact a ground surface to reduce friction of the hoop structure as it rotates. In some embodiments, the plurality of carbon capture containers are supported by the hoop structure. The plurality of fans may be disposed to blow air through the carbon capture containers. The first support structure may be disposed between the plurality of fans and the plurality of carbon capture containers.

In some embodiments, the atmospheric carbon dioxide removal system may further include a plurality of regeneration structures arranged, disposed and configured on each side of the plurality of carbon capture containers. In some embodiments, the hoop structure conveys the plurality of carbon capture containers from a carbon capture state to a carbon removal state. The carbon capture state includes the plurality of carbon capture containers being adjacent to the plurality of fans. The carbon removal state includes the plurality of carbon capture containers being adjacent to the plurality of regeneration structures. In some embodiments, the plurality of carbon capture containers is a first plurality of carbon capture containers and the atmospheric carbon dioxide removal system further includes a second plurality of carbon capture containers supported by the hoop structure. The second plurality of carbon capture containers may be in the carbon capture state when the first plurality of carbon capture containers are in the carbon removal state.

The present disclosure is further directed to a carbon capture container that includes a sorbent material holding apparatus that has a sidewall and a first opening on a first side of the sorbent material holding apparatus and a second opening on an opposing second side of the sorbent material holding apparatus. The carbon capture container further includes a frame that supports the sorbent material holding apparatus, a first grating covering the first opening, and a second grating covering the second opening. In some embodiments, the carbon capture container may further include at least one locking point disposed on an exterior surface of the sorbent material holding apparatus. In some embodiments, the sorbent material holding apparatus is a cylinder having a diameter, wherein the diameter is equal to a height of the frame. In some embodiments, the sorbent material holding apparatus may contain a plurality of sorbent material sub containers configured to receive air flowing in the first direction, to redirect the air through the sorbent material in a second direction orthogonal to the first direction, and to return the air flowing to the first direction from the outwardly facing side into the enclosed space. In some embodiments, the sorbent material sub containers is a cylinder having a diameter, wherein the diameter is smaller than the apparatus diameter. In some embodiments, the sorbent material holding apparatus or sorbent material sub containers may be filled with a sorbent material having a first diameter. The first grating may include openings having a second diameter so that the second diameter is smaller than the first diameter. In some embodiments, the sorbent material holding apparatus may be constructed of 316 stainless steel.

The present disclosure is further directed to a carbon dioxide removal system that includes a carbon capture vessel, a carbon removal apparatus, and an apparatus that conveys the carbon capture apparatus from a first position to a second position. The carbon capture apparatus may be inside the carbon removal apparatus when in the first position. The carbon capture apparatus is disposed outside of the carbon removal apparatus when in the second position. The carbon removal apparatus converts the carbon capture apparatus into a pressure vessel that removes carbon dioxide. In some embodiments, the carbon removal apparatus further includes a first door and a second door. When in the first position the carbon capture apparatus may be disposed between the first door and the second door. When in the second position the carbon capture apparatus may be disposed laterally from the first door and the second door.

In some embodiments, the carbon capture apparatus includes a first opening at a first end and a second opening at an opposing second end. In some embodiments, the carbon removal apparatus seals the first opening and the second opening to convert the carbon capture apparatus into the pressure vessel. In some embodiments, a motor is configured to increase and decrease the pressure inside the pressure vessel. In some embodiments, water pipes deliver water to the pressure vessel and drain pipes that remove water from the pressure vessel. In some embodiments, steam pipes that deliver steam to the pressure vessel and condensation pipes extract and condense the steam into water and extract carbon dioxide. In some embodiments, a motor that opens and closes the carbon removal apparatus and tracks that convey the carbon removal apparatus as it opens and closes.

The present disclosure is further directed to a method of laterally displacing a carbon capture vessel containing a sorbent material to align with doors for the carbon capture vessel. Then sealing the carbon capture vessel by closing the doors to form a regeneration chamber. Then performing a carbon dioxide extraction process. Then, unsealing the regeneration chamber to thereby convert it to a carbon capture cylinder. Finally, laterally displacing the carbon capture cylinder to align with airflow from a fan.

In some embodiments, the method further includes performing, after sealing the carbon capture vessel, a first pressure reducing process inside the regeneration chamber to evacuate air. Followed by, performing a first flushing process including flushing the regeneration chamber with water. Next, performing a heating process to increase a temperature of the regeneration chamber to desorb carbon dioxide from the sorbent material. Followed by a second pressure reducing process inside the regeneration chamber to further desorb carbon dioxide from the sorbent material. Then, filling the regeneration chamber with water that produces steam when it contacts the heated sorbent material. Then performing a pressurizing and vibration process. Finally, performing a third pressure reducing process to the regeneration chamber, wherein the pressure is reduced to about 1 bar.

In some embodiments, the carbon capture vessel has an opening on a first side and an opening on an opposing second side so that sealing the carbon capture vessel includes sealing the opening on the first side and the opening on the second side. The sealing may be performed by closing one or more doors. In some embodiments, the first pressure reducing process lowers an air pressure inside the regeneration chamber to a pressure of about 0 bar to about 0.5 bar. In some embodiments, the second pressure reducing process lowers an air pressure inside the regeneration chamber to a pressure of about 0 bar to about 0.5 bar In some embodiments, the method further includes placing a second regeneration chamber in pressure communication with a first regeneration chamber so that the second regeneration chamber transfers heat from the first regeneration chamber. In some embodiments, the heating process includes flowing steam through the regeneration chamber.

In some embodiments, the carbon dioxide extraction process includes flowing steam through the regeneration chamber, removing the steam from the regeneration chamber, and condensing the steam to form liquid water and pure carbon dioxide. In some embodiments, after performing the heating process, performing the second pressure reducing process inside the regeneration chamber. In some embodiments, filling the regeneration chamber with water includes cooling the water to a temperature of about 0° C. to about 10° C. In some embodiments, the first pressurizing process increases the pressure of the regeneration chamber to a pressure of about 8 bar to about 12 bar. In some embodiments, after performing the first pressurizing process, vibrating the regeneration chamber over a time period of about 1 minute to about 5 minutes. In some embodiments, the vibrating includes continuously vibrating the regeneration chamber during the time period. In some embodiments, the vibrating includes vibrating the regeneration chamber over a period of about 5 seconds to about 30 seconds during each minute of the time period. In some embodiments, the third pressure reducing process further includes removing the water from the regeneration chamber and flushing the regeneration chamber with water cooled to a temperature of about 0° C. to about 10° C.

The present disclosure is further directed to an atmospheric carbon dioxide removal system that includes a plurality of carbon capture containers having an outwardly facing side and an inwardly facing side, the inwardly facing side facing an enclosed space. Further including, a plurality of fans disposed adjacent the plurality of carbon capture containers, the plurality of fans being arranged to move air through the plurality of carbon capture containers in a first direction from the outwardly facing side into the enclosed space. Further including a plurality of sorbent material sub containers arranged within the plurality of carbon capture containers to receive air flowing in the first direction, to redirect the air through the sorbent material in a second direction orthogonal to the first direction, and to return the air flowing to the first direction from the outwardly facing side into the enclosed space. And further including an air diverter that is disposed within the enclosed spaced that is structurally configured to receive the air flowing in the first direction and redirect the air to flow in a second direction angled upwardly from the first direction.

In some embodiments, the atmospheric carbon dioxide removal system further includes a plurality of regeneration structures disposed adjacent the plurality of carbon capture containers and adjacent the plurality of fans. The carbon capture containers remove carbon dioxide from the air and the regeneration structures remove the carbon dioxide from the carbon capture containers. In some embodiments, the plurality of carbon capture containers is a first plurality of carbon capture containers and the atmospheric carbon dioxide removal system further includes a second plurality of carbon capture containers disposed on top of the first plurality of carbon capture containers to form a stack of carbon capture containers.

In some embodiments, the atmospheric carbon dioxide removal system further includes a velocity stack disposed over the enclosed space. The stack of carbon capture containers has a first height and the velocity stack has a second height that is greater than the first height. In some embodiments, the plurality of carbon capture containers contains a sorbent material designed to remove carbon dioxide from the air. In some embodiments, the air diverter has a base and a top. The base has a first cross-sectional width and the top has a second cross-sectional width that is smaller than the first cross-sectional width. In some embodiments, the air diverter is formed of a flexible material and may be adjusted in height.

The present disclosure is further directed to an atmospheric carbon dioxide removal system that includes a plurality of carbon capture containers having an outwardly facing side and an inwardly facing side, the inwardly facing side facing an enclosed space. A plurality of fans disposed adjacent the plurality of carbon capture containers, the plurality of fans being arranged to move air through the plurality of carbon capture containers in a first direction from the outwardly facing side into the enclosed space. Further including a plurality of sorbent material sub containers arranged within the plurality of carbon capture containers to receive air flowing in the first direction, to redirect the air through the sorbent material in a second direction orthogonal to the first direction, and to return the air flowing to the first direction from the outwardly facing side into the enclosed space. Further including a velocity stack disposed on top of the enclosed space that accelerates the flow of the air in a second direction. In some embodiments, the atmospheric carbon dioxide removal system further includes a plurality of regeneration structures disposed adjacent the plurality of carbon capture containers and adjacent the plurality of fans. The carbon capture containers remove carbon dioxide from the air that is flowing in the first direction. The regeneration structures remove the carbon dioxide from the carbon capture containers.

In some embodiments, the plurality of carbon capture containers is a first plurality of carbon capture containers and the atmospheric carbon dioxide removal system further includes a second plurality of carbon capture containers disposed on top of the first plurality of carbon capture containers to form a stack of carbon capture containers. In some embodiments, the stack of carbon capture containers has a first height and the velocity stack has a second height that is greater than the first height. In some embodiments, the plurality of carbon capture containers contains a sorbent material designed to remove carbon dioxide from the air. In some embodiments, the velocity stack has a bottom opening and a top opening. The bottom opening has a first diameter and the top opening has a second diameter that is smaller than the first diameter. In some embodiments, the atmospheric carbon dioxide removal system further includes an air diverter in the enclosed space. The air diverter may have a base and a top, with the base having a first cross-sectional width and the top having a second cross-sectional width smaller than the first cross-sectional width.

What is claimed is:

1. A carbon capture container, comprising:
    a sorbent material holding apparatus having a sidewall and a first opening on a first side of the sorbent material holding apparatus and a second opening on an opposing second side of the sorbent material holding apparatus;
    one or more sorbent material holding sub containers disposed in the sorbent material holding apparatus, each of the one or more sorbent material holding sub containers having a grated or screened sidewall, an open first end, and a plugged second end;
    a sorbent material disposed in each of the one or more sorbent material holding sub containers;
    a frame surrounding a portion of the sorbent material holding apparatus such that the frame supports the sorbent material holding apparatus.

2. The carbon capture container of claim 1, wherein the one or more sorbent material holding sub containers is configured to receive air flowing in a first direction, to redirect the air flowing through the sorbent material in a second direction orthogonal to the first direction, and to return the air flowing to the first direction.

3. The carbon capture container of claim 1, further comprising:
    at least one locking point disposed on an exterior surface of the sorbent material holding apparatus.

4. The carbon capture container of claim 1, wherein the sorbent material holding apparatus is a cylinder having a diameter, wherein the diameter is equal to a height of the frame.

5. The carbon capture container of claim 1, wherein the one or more sorbent material holding sub containers is a cylinder and filled with a sorbent material having a first diameter, wherein the sidewall includes openings having a second diameter, and wherein the second diameter is smaller than the first diameter.

6. The carbon capture container of claim 1, wherein the one or more sorbent material holding sub containers is configured to receive air flowing in a first direction, to redirect the air flowing through the sorbent material in a second direction orthogonal to the first direction, and to return the air flowing to the first direction along an exterior of each of the one or more sorbent material holding sub containers through the second opening on the opposing second side of the sorbent material holding apparatus.

7. The carbon capture container of claim 1, wherein the one or more sorbent material holding sub containers is a cartridge.

8. The carbon capture container of claim 7, wherein the sorbent material is disposed in an annulus between a tube and an exterior wall of the cartridge.

9. The carbon capture container of claim 8, wherein the tube is perforated or slotted with apertures sized and shaped to permit air to flow from the tube and into the sorbent material and to keep sorbent material out of the tube.

10. The carbon capture container of claim 8, further comprising a radial flow enabler lid at the open first end and configured to direct air flow into the tube and seal against the sidewall of the sorbent material holding apparatus.

11. The carbon capture container of claim 1, further comprising an open annular space between the sorbent material holding apparatus and the one or more sorbent material holding sub containers.

12. The carbon capture container of claim 1, wherein each of the one or more sorbent material holding sub containers comprises a cylindrical cartridge, each cylindrical cartridge comprising a grated or screened sidewall of a first diameter, a centrally disposed tube of a second diameter, a first cartridge end having an opening equal to the second diameter of the tube and a second cartridge end that is plugged, and wherein the second diameter is smaller than the first diameter.

13. The carbon capture container of claim 1, wherein the frame extends outwardly from the sorbent material holding apparatus in a direction transverse to the axis.

14. The carbon capture container of claim 1, wherein the one or more sorbent material holding sub containers is configured to receive a fluid flowing in a first direction, to redirect the fluid flowing through the sorbent material in a second direction orthogonal to the first direction, and to return the fluid flowing to the first direction.

15. The carbon capture container of claim 14, wherein the fluid is air.

16. The carbon capture container of claim 14, wherein the fluid is steam.

17. The carbon capture container of claim 14, wherein the fluid is water.

18. The carbon capture container of claim 14, wherein the fluid is a solvent containing a chemical compound used to service or redress the sorbent material.

19. The carbon capture container of claim 14, wherein the one or more sorbent material holding sub containers is configured to return the fluid flowing to the first direction along an exterior of the one or more sorbent material holding sub containers through the second opening on the opposing second side of the sorbent material holding apparatus.

\* \* \* \* \*